United States Patent [19]

Harris et al.

[11] Patent Number: 5,480,964
[45] Date of Patent: Jan. 2, 1996

[54] NEGATIVE BIREFRINGENT POLYIMIDE FILMS

[75] Inventors: Frank W. Harris; Stephen Z. D. Cheng, both of Akron, Ohio

[73] Assignee: The University of Akron, Akron, Ohio

[21] Appl. No.: 230,729

[22] Filed: Apr. 21, 1994

Related U.S. Application Data

[63] Continuation-in-part of Ser. No. 72,137, Jun. 4, 1993, Pat. No. 5,344,916, which is a continuation-in-part of Ser. No. 51,068, Apr. 21, 1993, abandoned.

[51] Int. Cl.⁶ .................. C08G 77/10; C08G 69/26
[52] U.S. Cl. .................. 528/353; 528/125; 528/128; 528/172; 528/173; 528/174; 528/176; 528/183; 528/188; 528/220; 528/229; 528/350; 528/351; 428/473.5
[58] Field of Search .................. 528/353, 125, 528/128, 172, 173, 174, 176, 183, 188, 220, 229, 350, 351; 428/473.5

[56] References Cited

U.S. PATENT DOCUMENTS

| | | |
|---|---|---|
| 5,071,997 | 12/1991 | Harris . |
| 5,128,782 | 7/1992 | Wood . |
| 5,130,827 | 7/1992 | Pavone et al. . |
| 5,138,474 | 8/1992 | Arakawa . |
| 5,196,953 | 3/1993 | Yeh et al. . |
| 5,344,916 | 9/1994 | Harris et al. .......... 528/353 |
| 5,395,918 | 3/1995 | Harris et al. . |

OTHER PUBLICATIONS

Frank W. Harris and Raymond B. Seymour "Structure–Solubility Relationships in Polymers" Aug. 30–Sep. 3, 1976, pp. 183–214.

*Primary Examiner*—P. Hampton-Hightower
*Attorney, Agent, or Firm*—Oldham, Oldham & Wilson, Co.

[57] ABSTRACT

A negative birefringent film, useful in liquid crystal displays, and a method for controlling the negative birefringence of a polyimide film is disclosed which allows the matching of an application to a targeted amount of birefringence by controlling the degree of in-plane orientation of the polyimide by the selection of functional groups within both the diamine and dianhydride segments of the polyimide which affect the polyimide backbone chain rigidity, linearity, and symmetry. The higher the rigidity, linearity and symmetry of the polyimide backbone, the larger the value of the negative birefringence of the polyimide film.

12 Claims, 7 Drawing Sheets

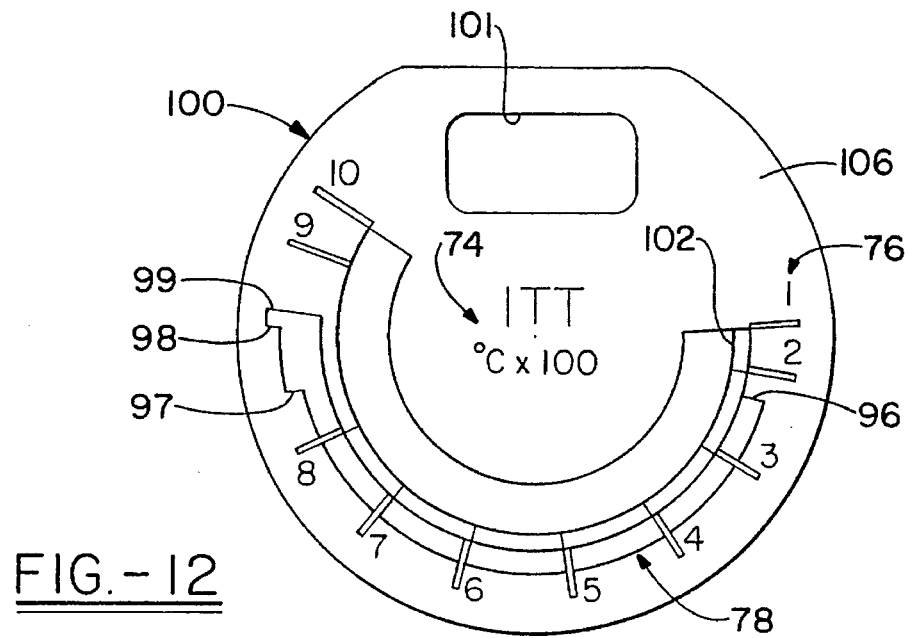
FIG.-12
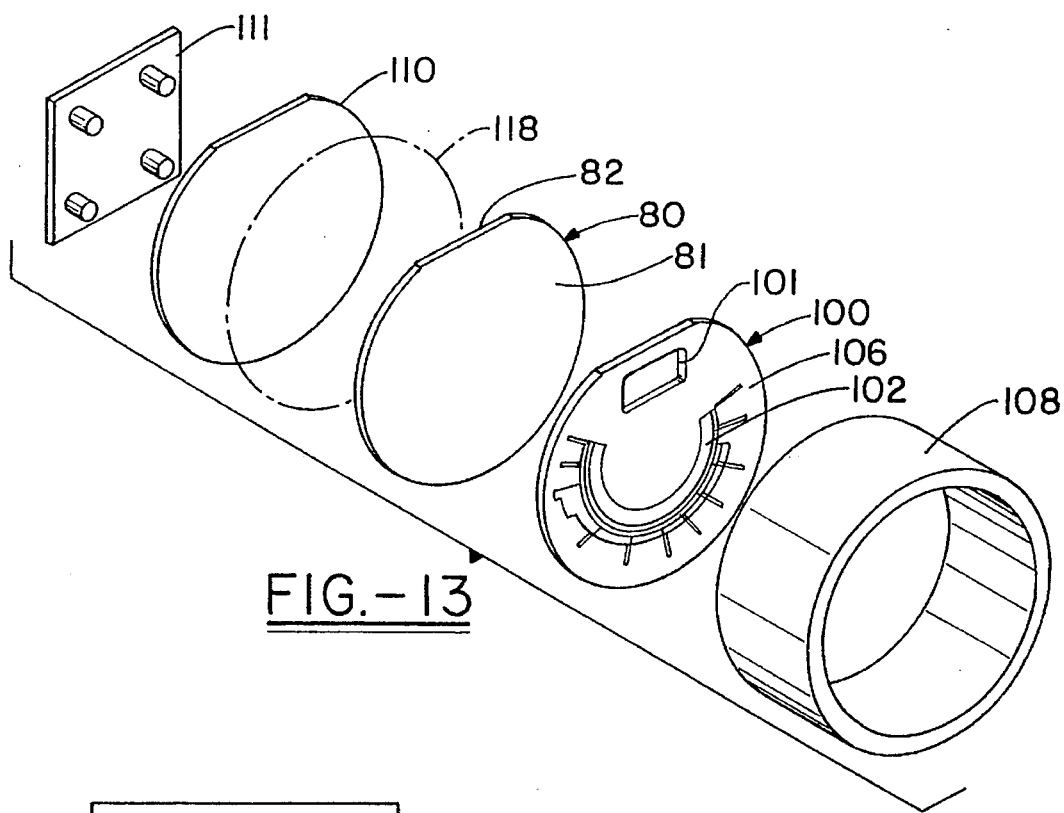
FIG.-13
Y = YELLOW
R = RED
B = BLACK
G = GREEN
FIG.-14

NEGATIVE BIREFRINGENT POLYIMIDE FILMS

This invention was made with Government support under DMR 91-57738 and DMR 89-20147 awarded by the National Science Foundation, and under NAG 1-448 awarded by BASA. The Government has certain rights in this invention. This is a continuation-in-part of application(s) Ser. No. 08/072,137 filed on Jun. 4, 1993 now U.S. Pat. No. 5,344,916 which was a Continuation-in-Part of Ser. No. 08/051,068 filed on Apr. 21, 1993 now abandoned.

TECHNICAL FIELD

The invention described herein pertains generally to negative birefringent soluble polyimide films for use in a compensator layer in a liquid crystal display.

BACKGROUND OF THE INVENTION

Liquid crystals are useful for electronic displays because light travelling through a thin film of liquid crystal is affected by the birefringence of the film, which can be controlled by the application of a voltage across the film. Liquid crystal displays are desirable because the transmission or reflection of light from an external source, including ambient light, can be controlled with much less power than is required for luminescent materials used in other displays. Liquid crystal displays are now commonly used in such applications as digital watches, calculators, portable computers, and many other types of electronic equipment where the need exists for long-lived operation, with very low voltage and low power consumption. In particular, portable computer displays benefit from liquid crystal displays where display power utilization must be minimized to permit the battery to operate for as long a period of time as possible before recharging, while allowing the majority of the battery utilization to be directed toward computational efforts.

When viewed directly, a liquid crystal display provides a high quality output. However, at large viewing angles, the image degrades and exhibits poor contrast. This occurs because liquid crystal cells operate by virtue of the birefringent effect exhibited by a liquid crystal medium which includes a large number of anisotropic liquid crystal molecules. Such a material will be positively uniaxially birefringent ($n_{195} > n_\parallel$ i.e., the extraordinary refractive index is larger than the ordinary refractive index) with the extraordinary refractive index associated with the alignment of the long molecular axes. The phase retardation effect of such a material on light passing through it inherently varies with the inclination angle of the light, leading to a lower quality image at large viewing angles. By introducing an optical compensating element in conjunction with the liquid crystal cell, however, it is possible to correct for the unwanted angular effects and thereby maintain higher contrast at larger viewing angles than otherwise possible.

The type of optical compensation required depends on the type of display which is used. In a normally black display, the twisted nematic cell is placed between polarizers whose transmission axes are parallel to one another and to the orientation of the director of the liquid crystal at the rear of the cell (i.e., the side of the cell away from the viewer). In the unenergized state, no applied voltage, normally incident light from the backlight is polarized by the first polarizer and in passing through the cell, has its polarization direction rotated by the twist angle of the cell. The twist angle is set to 90° so that the light is blocked by the output polarizer. Patterns can be written in the display by selectively applying a voltage to the portions of the display which are to appear illuminated.

However, when viewed at large angles, the dark (unenergized) areas of a normally black display will appear light because of angle dependent retardation effects for light passing through the liquid crystal layer at such angles, i.e., off-nominal incidence light senses an angle-dependent change of polarization. Contrast can be restored by using a compensating element which has an optical symmetry similar to that of the twist cell, but which reverses its effect. One method is to follow the active liquid crystal layer with a twist cell of reverse helicity. Another is to use one or more A-plate retarder compensators. These compensation methods work because the compensation element shares an optical symmetry with the twisted nematic cell; both are uniaxial birefringent materials having an extraordinary axis orthogonal to the normal light propagation direction. These approaches to compensation have been widely utilized because of the ready availability of materials with the required optical symmetry. Reverse twist cells employ liquid crystals and A-plate retarders are readily manufactured by the stretching of polymers such as polyvinyl alcohol.

Despite the effectiveness of these compensation techniques, there are drawbacks to this approach associated with the normally black operational mode. The appearance of a normally black display is very sensitive to cell gap. Consequently, in order to maintain a uniform dark appearance, it is necessary to make the liquid crystal cell very thick, which results in unacceptably long liquid crystal response times. In addition, the reverse twist compensation technique requires the insertion of a second liquid crystal cell into the optical train, adding significant cost, weight, and bulk to the display. For these reasons, it is highly desirable to compensate a normally white display in order to avoid these disadvantages.

In a normally white display configuration, the 90° twisted nematic cell is placed between polarizers which are crossed, such that the transmission axis of each polarizer is parallel to the director orientation of the liquid crystal molecules in the region of the cell adjacent to it. This reverses the sense of light and dark from that of the normally black display. The unenergized (no applied voltage) areas appear light in a normally white display, while those which are energized appear dark. The problem of ostensibly dark areas appearing light when viewed at large angles still occurs, but the reason for it is different and its correction requires a different type of optical compensating element. In the energized areas, the liquid crystal molecules tend to align with the applied electric field. If this alignment were perfect, all the liquid crystal molecules in the cell would have their long axes normal to the substrate glass. This arrangement, known as homeotropic configuration, exhibits the optical symmetry of a positively birefringent C-plate. In the energized state, the normally white display appears isotropic to normally incident light, which is blocked by the crossed polarizers.

The loss of contrast with viewing angle occurs because the homeotropic liquid crystal layer does not appear isotropic to off-normal light. Light directed at off normal angles propagates in two modes due to the birefringence of the layer, with a phase delay between those modes which increases with the incident angle of the light. This phase dependence on incidence angle introduces an ellipticity to the polarization state which is then incompletely extinguished by the second polarizer, giving rise to slight leakage. Because of the C-plate symmetry, the birefringence has no azimuthal dependence. Clearly what is needed is an optical compensating element, also in C-plane symmetry, but with negative ($n_\parallel > n_\perp$) birefringence. Such a compensator would introduces a phase delay opposite in sign to that caused by the liquid crystal layer, thereby restoring the original polarization state, allowing the light to be blocked by the output polarizer.

This technique has not been used in the past because it has been difficult or impossible to construct a C-plate compensator with the required optical symmetry. There has been no way found to stretch or compress polymers to obtain large area films with negative C-plate optical symmetry and the required uniformity, nor is it possible to form a compensator from a negatively birefringent crystal such as sapphire. In order for a compensator to be effective, the phase retardation of such a plate would have to have the same magnitude as the phase retardation of the liquid crystal and would also have to have the same magnitude as the phase retardation of the liquid crystal and would also have to change with the viewing angle at the same rate as the change of the liquid crystal's phase retardation. These constraints imply that the thickness of the negative plate would thus be on the order of 10 μm, making such an approach very difficult to accomplish because it would require the polishing of an extremely thin plate having the correct (negative) birefringence while ensuring that the surfaces of the plate remained parallel. Since such displays are relatively large in size, the availability of a negatively birefringent crystal of sufficient size would also be a major difficulty. Compensation techniques have been proposed which utilize crossed A-plate compensators. Such an arrangement, however, cannot produce a compensator with an azimuthal (C-plate) symmetry. Because of these difficulties, the tendency in the art has been to rely on normally black displays, even though the normally white type could produce a superior quality display if an appropriate compensator were available.

Previous attempts at compensator fabrication are described, for example in U.S. Pat, No. 5,138,474, to Fuji Photo Film Co., Ltd., and wherein the technique relied upon for imparting negative birefringence required film stretching. Compensators are designed to improve the viewing angle dependence which is a function of retardation (Re), defined as a product of a birefringence (Δn) of a film and a film thickness (d). The viewing angle is improved by inserting a film having an optic axis substantially in the normal direction, more specifically, a laminated film of a biaxially stretched film having a negative intrinsic birefringence and a uniaxially stretched film having a positive intrinsic birefringence between a liquid crystal cell and a polarizing sheet. Preferred examples of polymers for use in preparing the stretched films having a positive intrinsic birefringence include polycarbonates, polyarylates, polyethylene terephthalate, polyether sulfone, polyphenylene sulfide, polyphenylene oxide, polyallyl sulfone, polyamide-imides, polyimides, polyolefins, polyvinyl chloride, cellulose and polyarylates and polyesters which have a high intrinsic birefringence prepared by for example, solution casting.

Preferred examples of negative intrinsic birefringence stretched films would include styrene polymers, acrylic ester polymers, methacrylic ester polymers, acrylonitrile polymers and methacrylonitrile polymers with polystyrene polymers being most preferred from the viewpoint of large absolute value of intrinsic birefringence, transparency and ease of processing into films by solution casting.

However, to date, there still is lacking a method for producing negative intrinsic birefringence films without the need of having to resort to physical polymer film stretching to introduce the necessary orientation. Physical drawing of polymer films to achieve the necessary orientation and ordered areas which increase the scattering of light, are difficult to achieve, particularly regarding film uniformity. While on a macroscopic level the films superficially appear to be uniform, this is not the case on a microscopic level. To date, there has been no self-orienting, inherently in-plane oriented negative intrinsic birefringence films which are uniform on a microscopic level.

SUMMARY OF THE INVENTION

In accordance with the present invention, there is provided a novel class of soluble polyimides, which when used to cast films, undergo a self-orientation process whereby the polyimide backbone becomes more or less aligned parallel to the film surface. This in-plane orientation results in a film that displays negative birefringence.

It is another object of this invention to teach the ability to control the degree of in-plane orientation and thus, the magnitude of the negative birefringence by varying the polyimide backbone linearity and rigidity.

It is yet another object of this invention to teach that by increasing the polyimide backbone linearity and rigidity, the degree of in-plane orientation and associated negative birefringence can be increased, and that conversely, by decreasing the polyimide backbone linearity and rigidity, the negative birefringence can be decreased.

It is still another object of this invention to teach the preparation of thin polyimide films that display negative birefringence in excess of 0.2.

It is yet still another object of this invention to teach the preparation of thin polyimide films that are essentially non-birefringent.

It is another object of this invention to teach the ability to control the magnitude of the negative birefringence of thin polyimide films between zero and values in excess of 0.2 by adjusting the polyimide backbone linearity and rigidity.

It is an object of this invention to provide homopolyimides and copolyimides which are soluble in the imide form, in non-toxic organic solvents, preferably mixed solvents of ketones and ethers, which are capable of forming thin films, e.g., by spin coating, which exhibit negative birefringence.

These and other objects of this invention will be evident when viewed in light of the drawings, detailed description, and appended claims.

DETAILED DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

Figure 6:
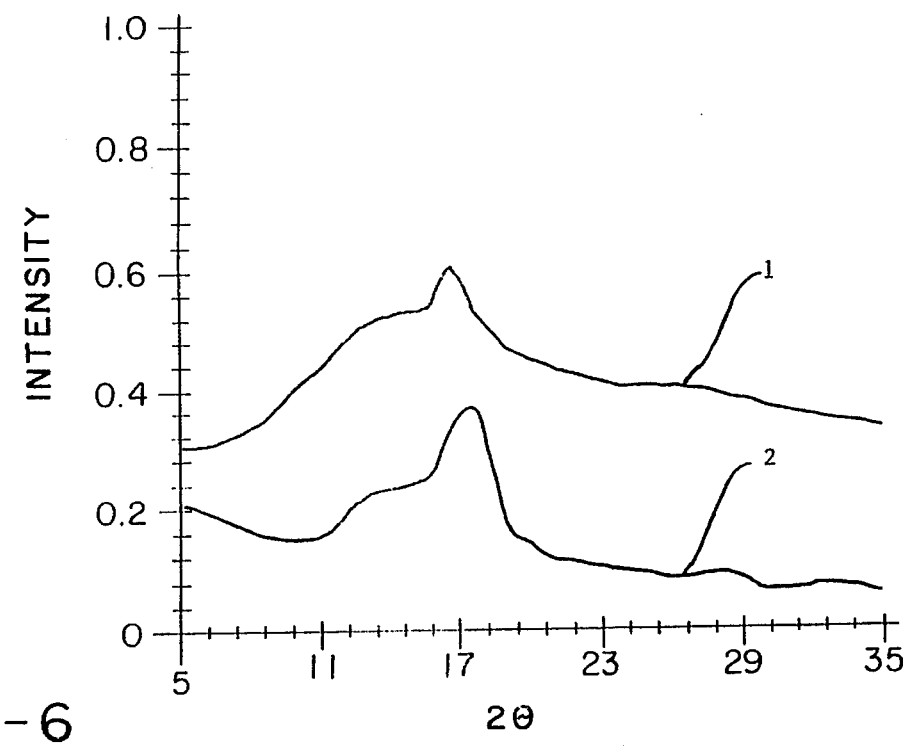
Figure 7:
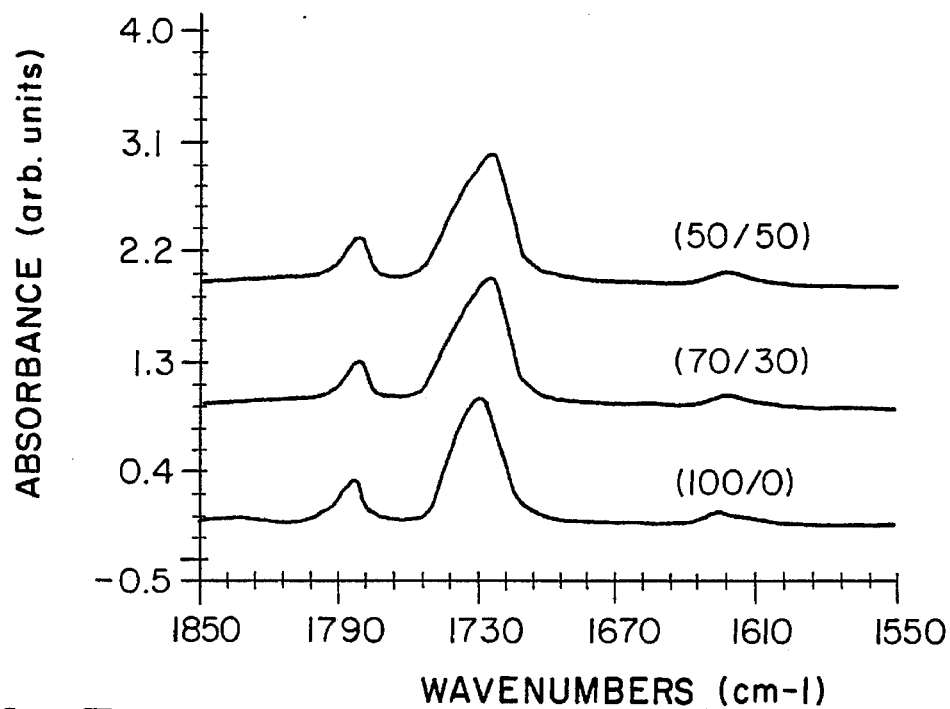
Figure 8:
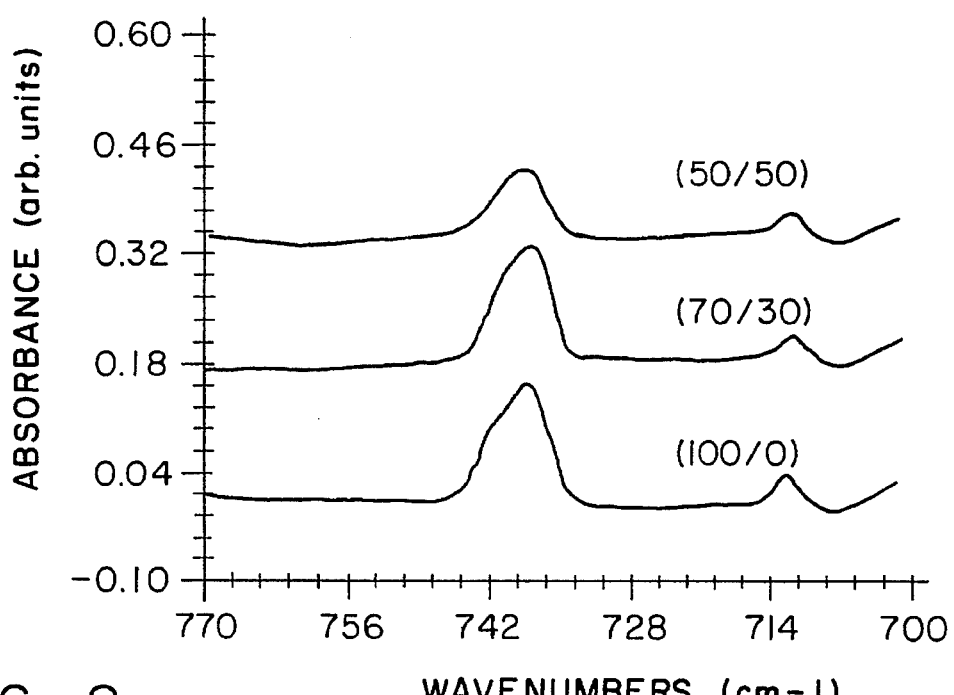
Figure 9:
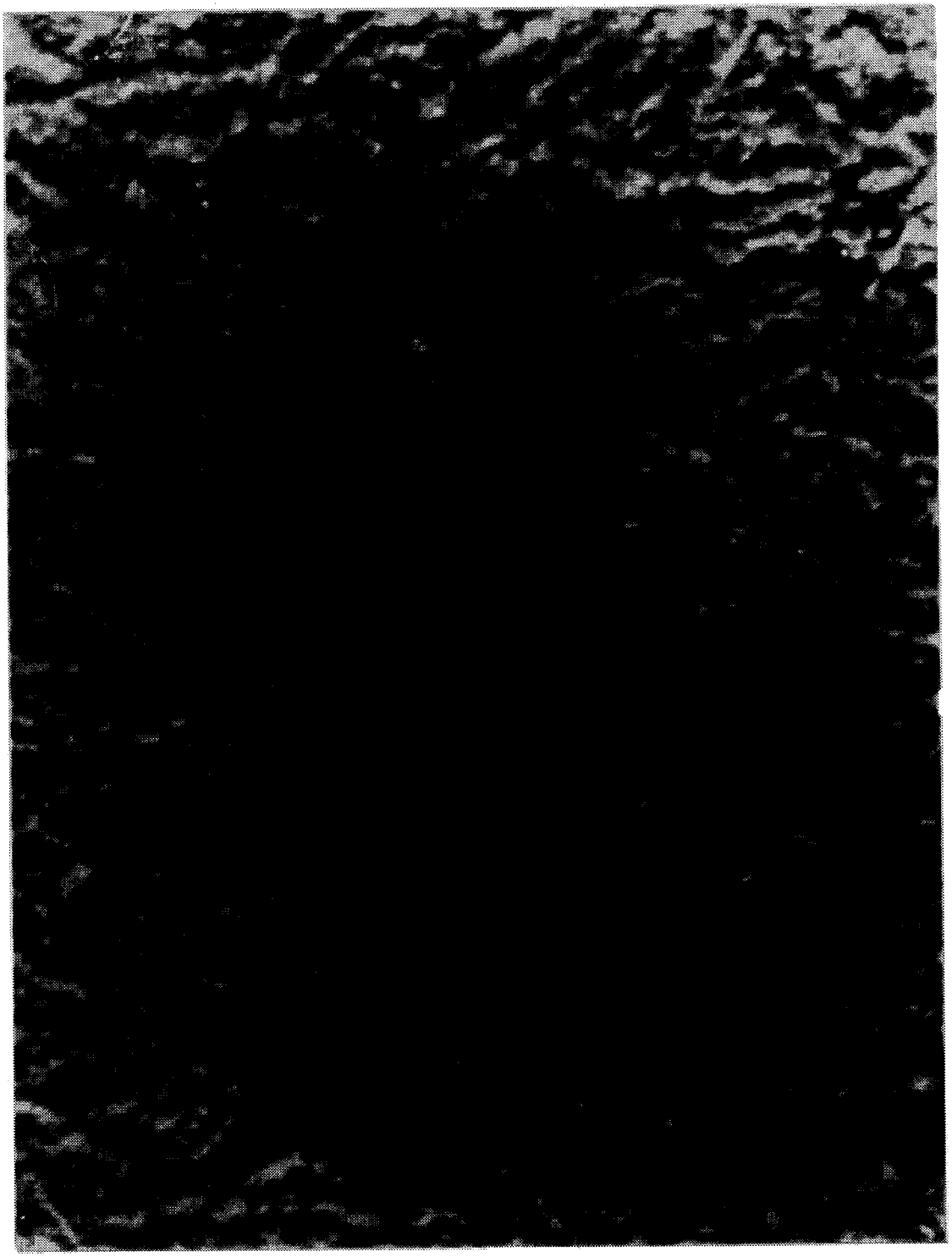
Figure 10:
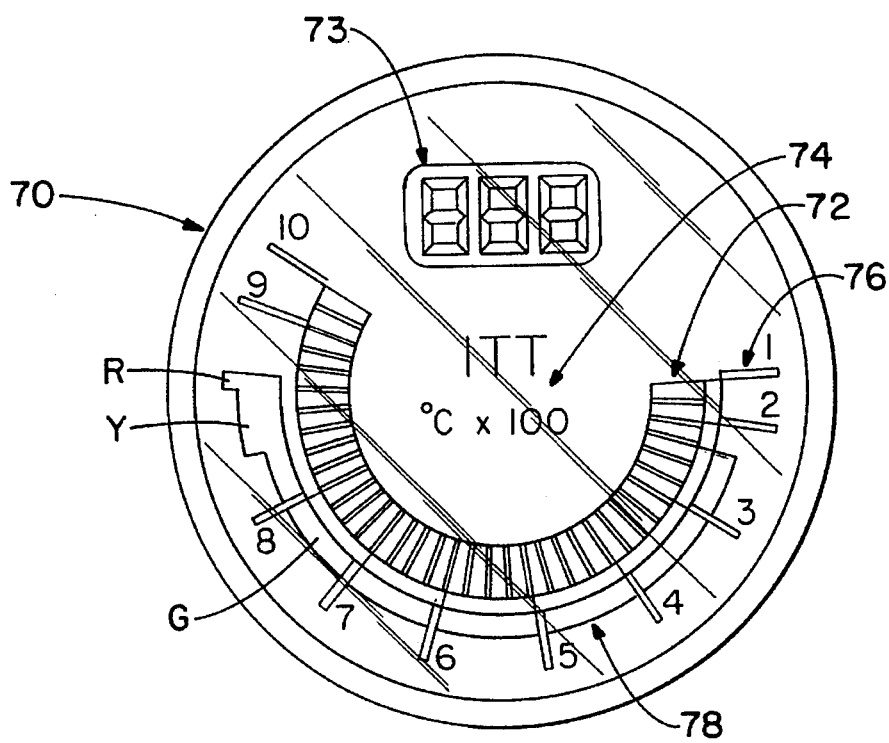
Figure 11:
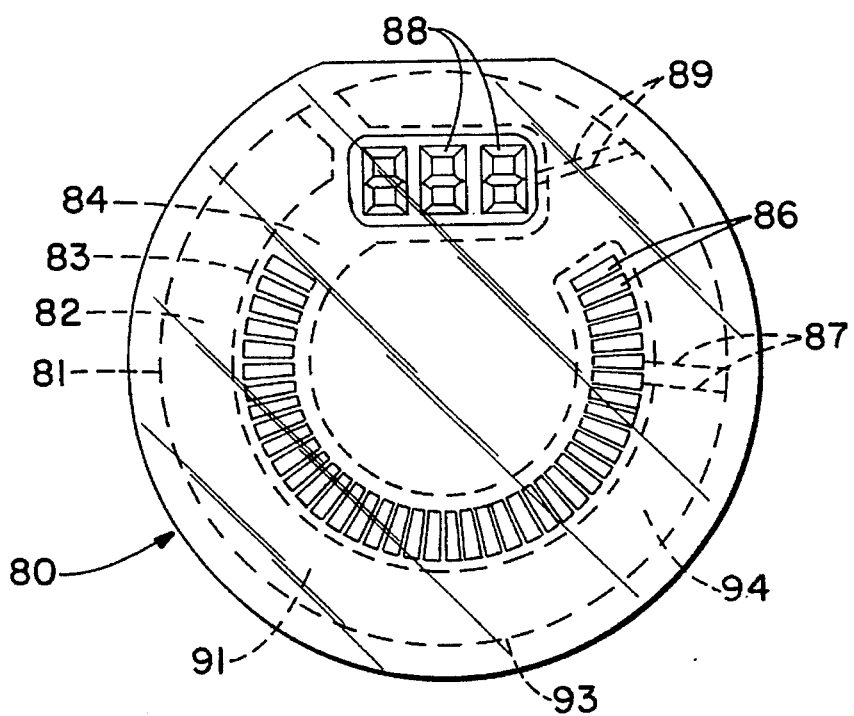

FIG. 6 is a Wide Angle X-Ray Diffraction (WAXD) pattern obtained via reflection mode for a (BPDA-TFMB)$_{0.5}$-(PMDA-TFMB)$_{0.5}$ copolyimide; and FIG. 7 is a Fourier Transform Infrared (FTIR) spectrograph of a series of (BPDA-TFMB)$_x$-(PMDA-TFMB)$_y$ copolyimides wherein x is 0.5, 0.7, and 1.0, while y varies correspondingly and is 0.5, 0.3, and 0 respectively at 1778 cm$^{-1}$ which represents symmetric and asymmetric stretching vibrations;

FIG. 8 is a Fourier Transform Infrared (FTIR) spectrograph of a series of (BPDA-TFMB)$_x$-(PMDA-TFMB)$_y$ copolyimides wherein x is 0.5, 0.7, and 1.0, while y varies correspondingly and is 0.5, 0.3, and 0 respectively at 738 cm$^{-1}$ which represents in-plane and out-of-plane vibrational modes;

FIG. 9 is transmission electron micrograph of a homopolyimide BPDA-TFMB thin film after etching in a potassium permanganate/phosphoric acid solution indicating a fibril type of texture indicating that the c-axis of the crystals is parallel to the fibril direction, revealing an in-plane orientation;

FIG. 10 shows a display with both active and passive display areas;

FIG. 11 shows a liquid crystal cell used in the display of FIG. 10;

FIG. 12 shows a mask which is used in conjunction with the liquid crystal cell of FIG. 11;

FIG. 13 is an exploded perspective view of the various components of a liquid crystal display (LCD);

FIG. 14 is a color chart for the colors indicated by legend in FIGS. 10, 12 and 13.

DETAILED DESCRIPTION OF THE INVENTION

The homopolyimides and copolyimides of this invention consist of combinations of benzene dianhydrides, such as pyromellitic dianhydride and substituted pyromellitic dianhydrides of general formula (I):

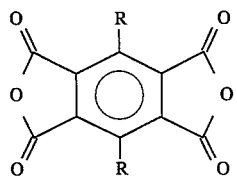
(I)

and/or tetracarboxylic acid dianhydrides of formula and their respective substituted derivatives, (II);

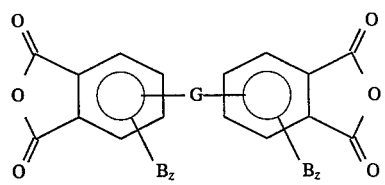
(II)

with monoaromatic and polyaromatic diamines of formula (III)

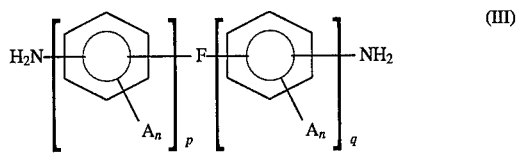
(III)

where each R is a substituent selected independently from the exemplary group of H, halogen, phenyl, substituted phenyl, alkyl, and substituted alkyl, particularly halogenated alkyls; G and F are independently selected from the representative and illustrative group consisting of a covalent bond or linking bond, a $CH_2$ group, a $C(CH_3)_2$ group, a $C(CF_3)_2$ group, a $C(CX_3)_2$ group wherein X is a halogen, a CO group, an O atom, a S atom, a $SO_2$ group, a $Si(CH_2CH_3)_2$ group or $N(CH_3)$ group; B is selected from the group consisting of halogen, viz. fluoride, chloride, iodide and bromide, $C_{1-3}$ alkyls, $C_{1-3}$ halogenated alkyls, phenyl or substituted phenyl wherein the substituents on the phenyl ring include halogens, $C_{1-3}$ alkyls, $C_{1-3}$ halogenated alkyls and combinations thereof; z is an integer from 0 to 3; each A is selected independently from the group consisting of hydrogen, halogen, viz. fluoride, chloride, iodide and bromide; alkyl, substituted-alkyl such as halogenated alkyls, nitro, cyano, thioalkyl, alkoxy, aryl or substituted-aryl such as halogenated aryls, alkyl esters and substituted alkyl esters and combinations thereof; n is an integer from 0 to 4; and p and q are integers from 0 to 3 and 1 to 3 respectively, and wherein when p and q are greater than 1, the linking group between benzyl or substituted benzyl groups is F.

In a preferred embodiment, the tetracarboxylic acid dianhydride of formula (II) will be substituted in the 2 and 2' positions as shown in formula (X)

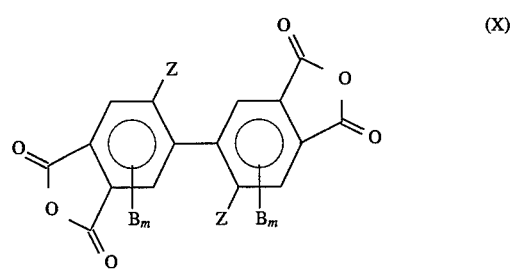
(X)

and wherein $A_n$ is as defined previously and further wherein each B and Z are selected independently from the group consisting of halogen, viz. fluoride, chloride, iodide and bromide, $C_{1-3}$ alkyls, $C_{1-3}$ halogenated alkyls, phenyl or substituted phenyl wherein the substituents on the phenyl ring include halogens, $C_{1-3}$ alkyls, $C_{1-3}$ halogenated alkyls and combinations thereof; m is an integer from 0 to 2.

Thus, it is understood that this invention envisions homopolymers made from: (1) an acid dianhydride of formula (II) and a diamine of formula (III), and shown in generic form by formula (IV); and

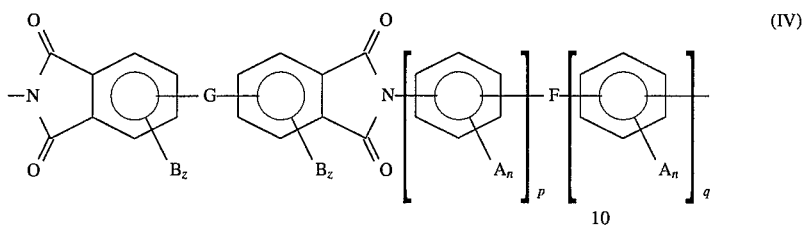

(2) homopolymers made from an acid dianhydride of formula (I) and a diamine of formula (III) in which case p must be at least 1 to insure solubility, and as shown in generic form by formula (V)

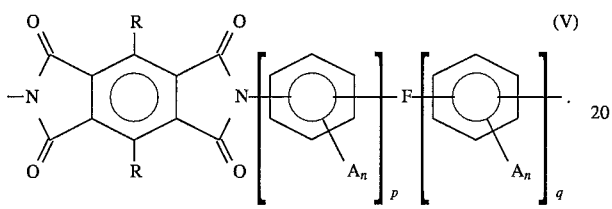

In a most preferred embodiment, the homopolymer made from the substituted acid dianhydride will be substituted in the 2 and 2' positions a shown in formula (X) and the diamine will be of formula (III), as shown in generic form by formula (XII)

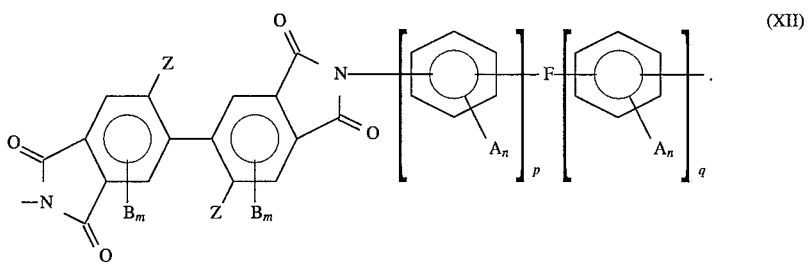

It is additionally understood that the term copolyimides as used in this application and the claims is not limited to polyimides containing only two different repeat units, but is intended to include any polyimide having two or more different repeat units. Thus, a copolyimide of the present invention can be made: (1) (a) with an acid dianhydride of formula (I) and at least two different diamines of formula (III) or (b) with at least two different acid dianhydrides of formula (I) and a diamine of formula (III) and shown in generic form by formula (VI)

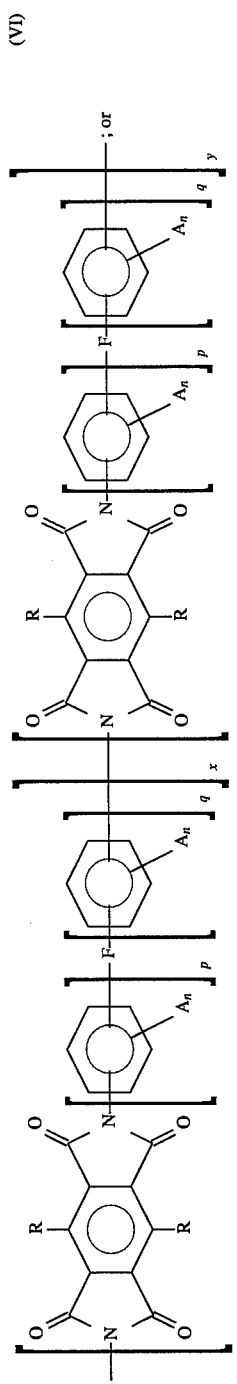
(VI)

(2) (a) with an acid dianhydride of formula (II) with at least two diamines of formula (III) or (b) at least two acid dianhydrides of formula (II) and a diamine of formula (III) and shown in generic form by formula (VH)

(VII)
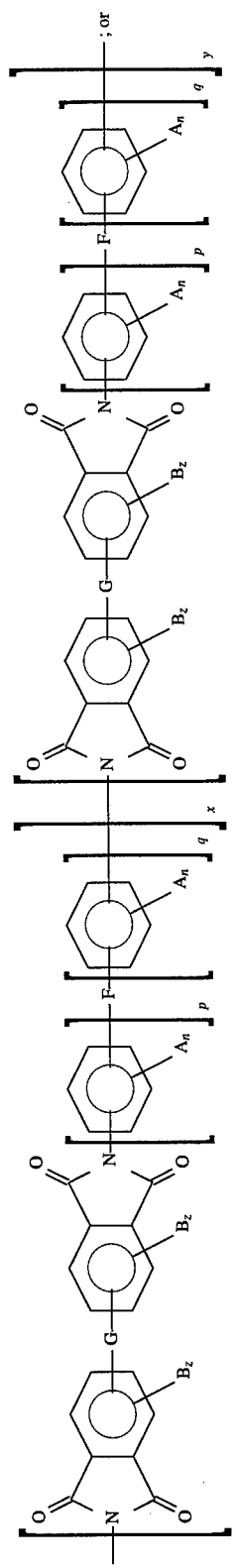

(3) with a diamine of formula (III) and two or more organic dianhydrides of formulas (I) and (II), or any combination thereof and shown in generic form by formula (VIII)

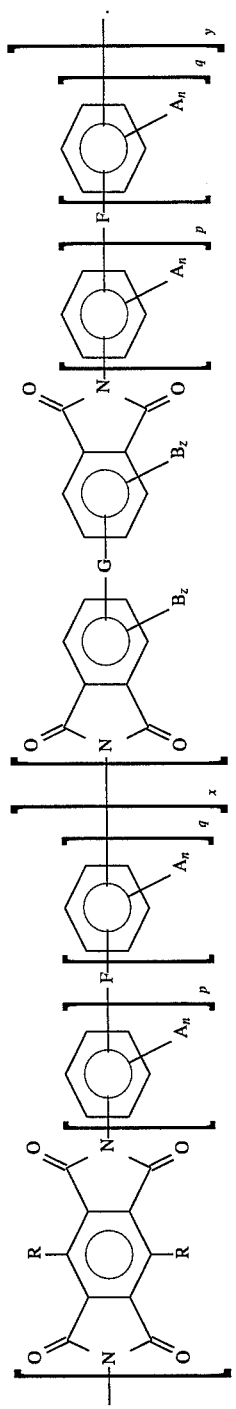

In a preferred embodiment, the best mode known to the applicant to date, the polyimide would have the form as generically shown in formula (XI)

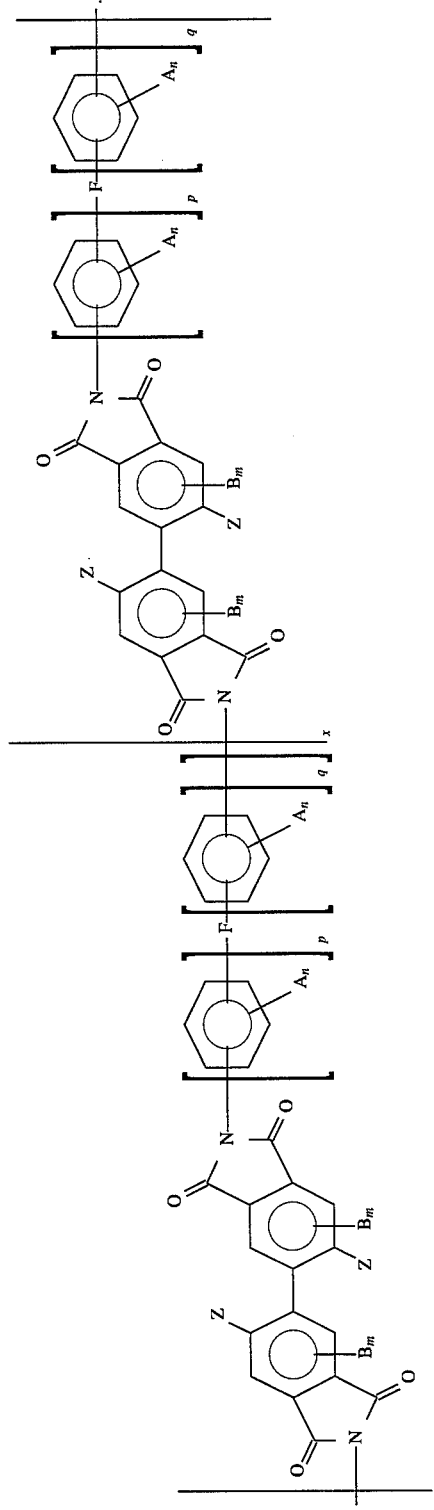
(XI)

It is appreciated that the relationship between x and y is inverse and that as x varies from 100 to 0, y correspondingly varies from 0 to 100.

Although the above polyimides and copolyimides as described do not have end groups or indicate what end groups are present, end groups are present and the nature of the end groups are controlled by the reaction conditions or are determined by the addition of capping reagents. Thus, the end groups can be either an amine group or an anhydride group or a combination thereof depending on the exact molecular composition of the starting reagents as well as the course of a random condensation polymerization.

If a diamine of formula (III) is used in slight excess from about 1 to 10 mole percent relative to a dianhydride of formulas (I or II or X), then the resulting polyimides will predominately be amine terminated, and the end groups of the polymer will be unreacted amine groups. On the other hand, if dianhydrides of formulas (I or II or X) are used in slight excess from about 1 to 10 mole percent relative to a diamine of formula (III), then the resulting polyimides will predominately be anhydride terminated, and the end groups of the polymer will be unreacted anhydride groups. However, circumstances could arise wherein the polyimides would be terminated by one amine group and one anhydride or acid group. In an analogous fashion, copolyimides of the present invention can be terminated with anhydride groups, amino groups or some mixture thereof, depending on the exact polymerization conditions and molar ratios of the reacting diamines and dianhydrides.

In certain cases, a terminating agent can be employed to force the termination of a growing polyimide or copolyimide. These agents are often used to control the molecular weight of the polymer by reducing the ultimate length of the polymer chains and/or to impart desired functionality to the end of the polymer chain. These agents can be either simple anhydrides or simple amines or reactants reactive therewith. Because these agents are preferably mono-functional, they will cause the growing polymer chain to be capped with the particular agents employed. Anhydrides which are useful as capping agents are selected from the representative and illustrative group consisting of aromatic anhydrides such as phthalic anhydride. Amines which are useful as capping agents are selected from the representative and illustrative group consisting of aromatic amines such as aniline, methyl anilines, dimethyl anilines or naphthylamines.

Representative and illustrative examples of these useful anhydrides in the invention are pyromelletic dianhydride, 3,6-diphenylpyromellitic dianhydride, 3,6-bis(trifluoromethyl)pyromellitic dianhydride, 3,6-bis(methyl)pyromellitic dianhydride, 3,6-diidopyromellitic dianhydride, 3,6-dibromopyromellitic dianhydride, 3,6-dichloropyromellitic dianhydride, 3,3',4,4'-benzophenonetetracarboxylic acid dianhydride, 2,3,3',4'-benzophenonetetracarboxylic acid dianhydride, 2,2',3,3'-benzophenone tetracarboxylic acid dianhydride, 3,3',4,4'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, bis(3,4-dicarboxyphenyl)ether dianhydride (4,4'-oxydiphthalic anhydride), bis(3,4-dicarboxyphenyl)sulfone dianhydride (3,3',4,4'-diphenylsulfonetetracarboxylic dianhydride), 4,4'-[4,4'-isopropylidene-di(p-phenyleneoxy)]bis(phthalic anhydride), N,N-(3,4-dicarboxyphenyl)-N-methylamine dianhydride, bis(3,4-dicarboxyphenyl)diethylsilane dianhydride; naphthalene tetracarboxylic acid dianhydrides such as 2,3,6,7- and 1,2,5,6-naphthalene-tetracarboxylic acid dianhydride, 2,6-dichloronaphthalene-1,4,5,8-tetracarboxylic acid dianhydride; or heterocyclic aromatic tetracarboxylic acid dianhydrides such as thiophene-2,3,4,5-tetracarboxylic acid dianhydride, pyrazine-2,3,5,6-tetracarboxylic acid dianhydride and pyridine-2,3,5,6-tetracarboxylic acid dianhydride.

Especially preferred dianhydrides would include 2,2'-substituted dianhydrides such as 2,2'-dibromo-4,4',5,5'-biphenyl tetracarboxylic dianhydride, 2,2'-dichloro-4,4',5,5'-biphenyl tetracarboxylic dianhydride, and the 2,2'-trihalo substituted dianhydrides, particularly 2,2'-bis(trifluoromethyl)-4,4'-5,5'-biphenyltetracarboxylic dianhydride.

And in general, diamines are selected from the representative and illustrative group consisting of benzene diamines such as o-, m- and p-phenylenediamine, 2,4-diaminotoluene, 1,4-diamino-2-methoxybenzene, 1,4-diamino-2-phenylbenzene and 1,3-diamino-4-chlombenzene. Other useful polyaromatic diamines in the invention would include 4,4+-diaminobiphenyl, 4,4'-diaminodiphenylmethane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, and 3,3'-diaminobenzophenone; naphthalene diamines such as 1,8- and 1,5-diminonaphthalene; or heterocyclic aromatic diamines such as 2,6-diaminopyridine, 2,4-diaminopyrimidine, and 2,4-diamino-s-triazine.

Especially useful are diamines of general formula (IX),

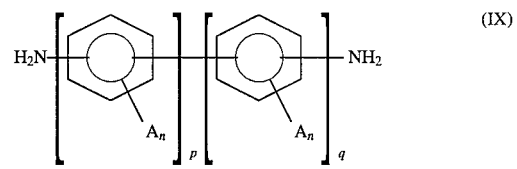

(IX)

and wherein p and q are 1, and A is preferably selected from the group consisting of $CH_3$, $CF_3$, halogen, CN, and esters wherein the carboalkoxy group is as defined previously and n is at least 1. An exemplary list of non-limiting examples would include 2,2'-bis(trifluoromethyl)-4,4'-diaminobiphenyl, 2,2'-dibromo-4,4'-diaminobiphenyl, 2,2'-dicyano-4,4'-diaminobiphenyl, 2,2'-dichloro-6,6'-dimethyl-4,4'-diaminobiphenyl, 2,2'-dimethyl-4,4'-diaminobiphenyl, 3,3'-dimethyl-4,4'-diaminobiphenyl, 2,2'-dicarboalkoxy-4,4'-diaminobiphenyl and 2,2'-dicarboalkoxy-6,6'-dimethyl-4,4'-diaminobiphenyl.

EXAMPLES

The invention will be better understood by reference to the following illustrative and non-limiting representative examples which show the preparation of polyimides and copolyimides which are soluble in organic solvents.

One-Step Procedure for Homopolyimides

Example 1

This example illustrates the preparation of a homopolyimide of 3,3',4,4'-benzophenonetetracarboxylic dianhydride (BTDA) and 2,2'-bis(trifluoromethyl)-4,4'-diaminobiphenyl (TFMB).

0.93 millimoles of BTDA was added to a stirred solution of 0.93 millimoles of TFMB in 5.4 grams of m-cresol (solids content 10% weight per weight of solvent) containing 0.06 grams of isoquinoline (optional) under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [η] (where [η] is the intrinsic viscosity) at 30.1° C. in m-cresol=1.62 dl/g; $T_g$=N/A; T(−5%)/air=550° C.; T(−5%)/$N_2$=560° C.; and soluble in m-cresol, p-chlorophenol.

Example 2

This example illustrates the preparation of a homopolyimide of 4,4'-oxydiphthalic anhydride (ODPA) and 2,2'-bis(trifluoromethyl)-4,4'-diaminobiphenyl (TFMB).

1.09 millimoles of ODPA was added to a stirred solution of 1.09 millimoles of TFMB in 6.21 grams of m-cresol (solids content 10% weight per weight of solvent) containing 0.06 grams of isoquinoline (optional) under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=1.1 dl/g; $T_g$=275° C.; T(−5%)/air=570° C.; T(−5%)/$N_2$=580° C.; and soluble in m-cresol, p-chlorophenol, NMP, and sym-tetrachloroethane.

Example 3

This example illustrates the preparation of a homopolyimide of 3,3',4,4'-diphenylsulfonetetracarboxylic dianhydride (DSDA) and 2,2'-bis(trifluoromethyl)-4,4'-diaminobiphenyl (TFMB).

0.93 millimoles of DSDA was added to a stirred solution of 0.93 millimoles of TFMB in 5.72 grams of m-cresol (solids content 10% weight per weight of solvent) containing 0.06 grams of isoquinoline (optional) under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=1.0 dl/g; $T_g$=320° C.; T(−5%)/air=540° C.; T(−5%)/$N_2$=51° C.; UV data-transparency on set=375 nm and maximum transparency=85%; and soluble in m-cresol and p-chlorophenol.

Example 4

This example illustrates the preparation of a homopolyimide of 3,3',4,4'-biphenyltetracarboxylic dianhydride (BPDA) and 2,2'-bis(trifluoromethyl)-4,4'-diaminobiphenyl (TFMB).

1.25 millimoles of BTDA was added to a stirred solution of 1.25 millimoles of TFMB in 6.9 grams of m-cresol (solids content 10% weight per weight of solvent) containing 0.08 grams of isoquinoline (optional) under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=4.9 dl/g; T(−5%)/air=600° C.; T(−5%)/$N_2$=600° C.; UV data-transparency onset=390 nm and maximum transparency=84%; and soluble in m-cresol and p-chlorophenol.

Example 5

This example illustrates the preparation of a homopolyimide of 2,2'-bis(3,4-dicarboxylphenyl)-1,1,1,3,3,3-hexafluoropropane dianhydride (6FDA) and 2,2'-bis(trifluoromethyl)-4,4'-diaminobiphenyl (TFMB).

4.68 millimoles of 6FDA was added to a stirred solution of 4.68 millimoles of TFMB in 32.2 grams of m-cresol (solids content 10% weight per weight of solvent) containing 0.2 grams of isoquinoline (optional) under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=1.42 dl/g; $T_g$=320° C.; T(−5%)/air=530° C.; T(−5%)/$N_2$ =540° C.; UV data-transparency onset=350 nm and maximum transparency=90%; and soluble in acetone, pentanone, THF, m-cresol, and p-chlorophenol.

Example 6

This example illustrates the preparation of a homopolyimide of 2,2'-bis(3,4-dicarboxyphenyl)-1,1,1,3,3,3-hexafluoropropane dianhydride (6FDA) and 4,4-diamino-2,2'-dichloro-6,6'-dimethylbiphenyl (DCM).

4.68 millimoles of 6FDA was added to a stirred solution of 4.68 millimoles of DCM in 33.9 grams of m-cresol (solids content 10% weight per weight of solvent) containing 0.2 grams of isoquinoline under $N_2$ at ambient temperature. After the solution was stirred for 3 hours, it was heated to near 200° C. and maintained at that temperature for 4 hours. During this time, the water of imidization was allowed to distill from the reaction mixture. After the solution was allowed to cool to ambient temperature, it was diluted with 30 ml of N-methylpyrrolidinone (NMP) and slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=1.10 dl/g; $T_g$=310° C.; T(–5%)/air=466° C.; T(–5%)/$N_2$ =512° C.; UV-Vis data-transparency cut-off=378 nm, maximum transparency=92%; and soluble in acetone, THF, cyclohexanone, chloroform, DMF, NMP, DMAc, and m-cresol.

Example 7

This example illustrates the preparation of a homopolyimide of 3,3',4,4'-biphenyltetracarboxylic dianhydride (BPDA) and 4,4'-diamino-2,2'-dichloro-6,6'-dimethylbiphenyl (DCM).

4.68 millimoles of BPDA was added to a stirred solution of 4.68 millimoles of DCM in 29 grams of m-cresol (solids content 10% weight per weight of solvent) containing 0.2 grams of isoquinoline under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to 120° C., it was diluted with 30 ml of m-cresol and slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=5.39 dl/g; $T_g$=342° C.; T(–5%)/air=465° C.; T(–5%)/$N_2$=516° C.; UV-Vis data-transparency cut-off=374 nm, maximum transparency=83%; and soluble in m-cresol.

Example 8

This example illustrates the preparation of a homopolyimide of 4,4'-oxydiphthalic anhydride (ODPA) and 4,4'-diamino-2,2'-dichloro-6,6'-dimethylbiphenyl (DCM).

4.68 millimoles of ODPA was added to a stirred solution of 4.68 millimoles of DCM in 28 grams of m-cresol (solids content 10% weight per weight of solvent) containing 0.2 grams of isoquinoline under $N_2$ at ambient temperature. After the solution was stirred for 4 hours, it was heated to near 200° C. and maintained at that temperature for 4 hours. During this time, the water of imidization was allowed to distill from the reaction mixture. After the solution was allowed to cool to ambient temperature, it was diluted with 30 ml of NMP and slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=3.45 dl/g; $T_g$=337° C.; T(–5%)/air=448° C.; T(–5%)/$N_2$=514° C.; UV-Vis data-transparency cut-off=380 nm, maximum transparency=88%; and soluble in chloroform, DMF, NMP, DMAc, and m-cresol.

Example 9

This example illustrates the preparation of a homopolyimide of 3,3',4,4'-benzophenonetetracarboxylic dianhydride (BTDA) and 4,4'-diamino-2,2'-dichloro-6,6'-dimethylbiphenyl (DCM).

4.68 millimoles of BTDA was added to a stirred solution of 4.68 millimoles of DCM in 28 grams of m-cresol (solids content 10% weight per weight of solvent) containing 0.2 grams of isoquinoline under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to 120° C., it was diluted with 30 ml of m-cresol and slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=4.00 dl/g; $T_g$=289° C.; T(–5%)/air=464° C.; T(–5%)/$N_2$=477° C.; UV-Vis data-transparency cut-off=378 nm, maximum transparency=85%; and soluble in chloroform, DMF, NMP, DMAc, and m-cresol.

Example 10

This example illustrates the preparation of a homopolyimide of 2,2'-bis(3,4-dicarboxylphenyl)-1,1,1,3,3,3-hexafluoropropane dianhydride (6FDA) and 4,4'-diamino-2,2'-dicarbobutoxy-6,6'-dimethylbiphenyl (DABMB).

4.68 millimoles of 6FDA was added to a stirred solution of 4.68 millimoles of DABMB in 39 grams of m-cresol (solids content 10% by weight per weight of solvent) containing 0.2 grams of isoquinoline under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 30 ml of NMP and slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=0.65 dl/g; $T_g$=223° C.; T(–5%)/$N_2$=350° C.; and soluble in acetone, cyclohexanone, THF, chloroform, DMF, NMP, DMAc, and m-cresol.

Example 11

This example illustrates the preparation of a homopolyimide of 3,3',4,4'-biphenyltetracarboxylic anhydride (BPDA) and 4,4'-diamino-2,2'-dicarbobutoxy-6,6'-dimethylbiphenyl (DABMB).

4.68 millimoles of BPDA was added to a stirred solution of 4.68 millimoles of DABMB in 33 grams of m-cresol (solids content 10% weight per weight of solvent) containing 0.2 grams of isoquinoline under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 30 ml of NMP and slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=4.25 dl/g; $T_g$=215° C.; T(–5%)/$N_2$=338° C.; and soluble in THF, chloroform, NMP, DMAc, and m-cresol.

Example 12

This example illustrates the preparation of a homopolyimide of 3,3',4,4'-benzophenonetetracarboxylic anhydride (BPDA) and 4,4'-diamino-2,2'-dicarbobutoxy-6,6'-dimethylbiphenyl (DABMB).

4.68 millimoles of BTDA was added to a stirred solution of 4.68 millimoles of DABMB in 35 grams of m-cresol (solids content 10% by weight per weight of solvent) containing 0.2 grams of isoquinoline under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 30 ml of NMP and slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=1.37 dl/g; $T_g$=203° C.; T(−5%)/$N_2$=360° C.; and soluble in THF, chloroform, NMP, DMAc, and m-cresol.

Example 13

This example illustrates the preparation of a homopolyimide of 4,4'-oxydiphthalic anhydride (ODPA) and 4,4'-diamino-2,2'-dicarbobutoxy-6,6'-dimethylbiphenyl (DABMB).

4.68 millimoles of BPDA was added to a stirred solution of 4.68 millimoles of DABMB in 35 grams of m-cresol (solids content 10% by weight per weight of solvent) containing 0.2 grams of isoquinoline under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 30 ml of NMP and slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=1.85 dl/g; $T_g$=191° C.; T(−5%)/$N_2$=336° C.; and soluble in THF, chloroform, NMP, DMAc, and m-cresol.

Example 14

This example illustrates the preparation of a homopolyimide of 2,2'-bis(3,4-dicarboxylphenyl)-1,1,1,3,3,3-hexafluoropropane dianhydride (6FDA) and 4,4'-diamino-2,2'-dicarbododecaoxy-6,6'-dimethylbiphenyl (DABDB).

4.68 millimoles of 6FDA was added to a stirred solution of 4.68 millimoles of DABDB in 50 grams of m-cresol (solids content 10% by weight per weight of solvent) containing 0.2 grams of isoquinoline under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 30 ml of NMP and slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=0.43 dl/g; $T_g$=107° C.; and soluble in acetone, cyclohexanone, THF, chloroform, DMF, NMP, DMAc, and m-cresol.

Example 15

This example illustrates the preparation of a homopolyimide of 2,2'-bis(3,4-dicarboxylphenyl)-1,1,1,3,3,3-hexafluoropropane dianhydride (6FDA) and 4,4'-diamino-2,2'-dicarbopentadecaoxy-6,6'-dimethylbiphenyl (DABPB).

4.68 millimoles of 6FDA was added to a stirred solution of 4.68 millimoles of DABPB in 52 grams of m-cresol (solids content 10% by weight per weight of solvent) containing 0.2 grams of isoquinoline under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 30 ml of NMP and slowly added to 1 liter of vigorously stirred 95% ethanol. The polymer that precipitated was collected by flirtation, washed with ethanol, and dried under reduced pressure at 150° C. for 24 hours.

Polymer properties: [η] at 30.1° C. in m-cresol=0.43 dl/g; $T_g$=100° C.; and soluble in acetone, cyclohexanone, THF, chloroform, DMF, NMP, DMAc, and m-cresol.

Example 16

This example illustrates the preparation of a homopolyimide of 2,2'-bis(3,4-dicarboxylphenyl)-1,1,1,3,3,3-hexafluoropropane dianhydride (6FDA) and 4,4'-diamino-2,2'-dicarbooctadecaoxy-6,6'-dimethylbiphenyl (DABOB).

4.68 millimoles of 6FDA was added to a stirred solution of 4.68 millimoles of DABOB in 54 grams of m-cresol (solids content 10% by weight per weight of solvent) containing 0.2 grams of isoquinoline under $N_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 30 ml of NMP and slowly added to 1 liter of vigorously stirred 95% ethanol. The polymer that precipitated was collected by filtration, washed with ethanol, and dried under reduced pressure at 150° C. for 24 hours.

Polymer properties: [η] at 30.1° C. in m-cresol=0.43 dl/g; $T_g$=95° C.; and soluble in acetone, cyclohexanone, THF, chloroform, DMF, NMP, DMAc, and m-cresol.

Two-Step Procedure for Homopolyimides

Example 17

This example illustrates the preparation of a homopolyimide of 3,3',4,4'-benzophenonetetracarboxylic acid dianhydride (BTDA) and 2,2'-bis(trifluoromethyl)-4,4'-diaminobiphenyl (TFMB).

1.55 millimoles of BTDA added to a stirred solution of 1.55 millimoles of TFMB in 9.0 grams of NMP (solids content 10% weight per weight of solvent) under $N_2$ at ambient temperature. After the solution was stirred for 24 hours, 3.41 millimoles of pyridine and 3.41 millimoles of acetic anhydride were added. After the solution was stirred for 24 hours, it was diluted with 8 ml of NMP and then added to 1 liter of vigorously stirred 95% ethanol. The polyimide was collected by filtration, washed with ethanol, and then dried at 150° C. under reduced pressure for 24 hours.

Polymer properties: [η] at 30.1° C. in m-cresol=0.84 dl/g of the intermediate polyamide-acid; T(−5%)/air=550° C.; and T(−5%)/$N_2$=560° C.

Example 18

This example illustrates the preparation of a homopolyimide of 4,4'-oxydiphthalic anhydride (ODPA) and 2,2'-bis(trifluoromethyl)-4,4'-diaminobiphenyl (TFMB).

1.56 millimoles of ODPA added to a stirred solution of 1.56 millimoles of TFMB in 5.57 grams of NMP (solids content 15% weight per weight of solvent) under $N_2$ at ambient temperature. After the solution was stirred for 24 hours, 2.67 millimoles of pyridine and 2.67 millimoles of acetic anhydride were added. After the solution was stirred for 24 hours, it was diluted with 8 ml of NMP and then added to 1 liter of vigorously stirred 95% ethanol. The polyimide was collected by filtration, washed with ethanol, and then dried at 150° C. under reduced pressure for 24 hours.

Polymer properties: [η] at 30.1° C. in m-cresol=0.57 dl/g; $T_g$=275° C.; T(–5%)/air=570° C.; and T(–5%)/$N_2$=580° C.

Example 19

This example illustrates the preparation of a homopolyimide of 3,3',4,4'-diphenylsulfonetetracarboxylic acid dianhydride (DSDA) and 2,2'-bis(trifluoromethyl)-4,4'-diaminobiphenyl (TFMB).

1.56 millimoles of DSDA added to a stirred solution of 1.56 millimoles of TFMB in 9.53 grams of NMP (solids content 10% weight per weight of solvent) under $N_2$ at ambient temperature. After the solution was stirred for 24 hours, 4.7 millimoles of pyridine and 4.7 millimoles of acetic anhydride were added. After the solution was stirred for 24 hours, it was diluted with 8 ml of NMP and then added to 1 liter of vigorously stirred 95% ethanol. The polyimide was collected by filtration, washed with ethanol, and then dried at 150° C. under reduced pressure for 24 hours.

Polymer properties: [η] at 30.1° C. in m-cresol=0.68 dl/g; $T_g$=320° C.; T(–5%)/air=540° C.; and T(–5%)/$N_2$=515° C.

One Step Procedure for Co-Polyimides

Example 20

This example illustrates the preparation of a co-polyimide based on 3,3',4,4'-benzophenonetetracarboxylic acid dianhydride (BTDA), 2,2'-bis(trifluoromethyl)-4,4'-diaminobiphenyl (TFMB) and 4,4'-diaminodiphenyl ether (DDE).

1.86 millimoles of BTDA was added to a stirred solution of 0.93 millimoles of TFMB and 0.93 millimoles of DDE in 9.8 g of m-cresol (solids content 10% weight per weight of solvent) containing 0.08 grams of isoquinoline (optional) under $N_2$ at ambient temperature. After the solution was stirred for 1 hour, it was heated to near 200° C. and maintained at that temperature for 3 hours. After the solution was allowed to cool to ambient temperature, it was diluted with 10 ml of m-cresol and then slowly added to 1 liter of vigorously stirred 95% ethanol. The copolymer that precipitated was collected by filtration, washed with ethanol, and dried under reduced pressure at 150° C. for 24 hours.

Copolymer properties: [η] at 30.1° C. in m-cresol=0.35 dl/g; and soluble in m-cresol and p-chlorophenol.

Example 21

This example illustrates the preparation of a co-polyimide based on 3,3',4,4'-biphenyltetracarboxylic dianhydride (BPDA), pyromellitic dianhydride (PMDA) and 2,2'-bis(trifluoromethyl)-4,4'-diaminobiphenyl (TFMB).

0.78 millimoles of BPDA was added to a stirred solution of 1.56 millimoles of TFMB in 8.1 g of m-cresol (solids content 10% weight per weight of solvent) containing 0.08 grams of isoquinoline (optional) under $N_2$ at ambient temperature. After the solution was stirred for 1 hour, it was heated to near 200° C. and maintained at that temperature for 3 hours. After cooling to room temperature, 0.78 millimoles of PMDA was added to the oligomer solution. The mixture was reheated to near 200° C. and maintained at that temperature for 3 hours. After the solution was allowed to cool to ambient temperature, it was diluted with 10 ml of m-cresol and then slowly added to 1 liter of vigorously stirred 95% ethanol. The copolymer that precipitated was collected by filtration, washed with ethanol, and dried under reduced pressure at 150° C. for 24 hours.

Copolymer properties: [η] at 30.1° C. in m-cresol=2.30 dl/g; T(–5%)/$N_2$=540° C.; and soluble in m-cresol and p-chlorophenol.

Example 22

This example illustrates the preparation of a co-polyimide based on 2,2'-bis(3,4-dicarboxylphenyl)-1,1,1,3,3,3-hexafluoropropane dianhydride (6FDA), pyromellitic dianhydride (PMDA) and 2,2'-bis(trifluoromethyl)-4,4'-diaminobiphenyl (TFMB).

0.78 millimoles of 6FDA was added to a stirred solution of 1.56 millimoles of TFMB in 8.1 g of m-cresol (solids content 10% weight per weight of solvent) containing 0.08 grams of isoquinoline (optional) under $N_2$ at ambient temperature. After the solution was stirred for 1 hour, it was heated to near 200° C. and maintained at that temperature for 3 hours. After cooling to room temperature, 0.78 millimoles of PMDA was added to the oligomer solution. The mixture was reheated to near 200° C. and maintained at that temperature for 3 hours. After the solution was allowed to cool to ambient temperature, it was diluted with 10 ml of m-cresol and then slowly added to 1 liter of vigorously stirred 95% ethanol. The copolymer that precipitated was collected by filtration, washed with ethanol, and dried under reduced pressure at 150° C. for 24 hours.

Copolymer properties: soluble in m-cresol and p-chlorophenol.

Example 23

This example illustrates the preparation of 2,2'-dibromo-4,4',5,5'-biphenyl tetracarboxylic dianhydride (DBBPDA).

3,3',4,4'-biphenyltetracarboxylic dianhydride (BPDA) (20.00 g, 0.068 mol) were dissolved in a solution of 10.88 g (0.272 mol) of NaOH in 150 ml of water in a three-necked, 500 ml, round-bottomed flask fitted with a magnetic stirring bar, a condenser, and an addition funnel. Bromination was carried out in five steps. In the first step, 1.50 ml of bromine was slowly added to the solution at 50° C. After the addition was complete, the solution was heated at 90° C. until most of the bromine had reacted. The mixture was cooled to room temperature and neutralized with an aqueous sodium hydroxide solution to a pH of 7.0. For the second, third, and fourth steps, 2.00 ml of bromine was used according to the procedure described previously. 2.5 ml of bromine was used in the fifth step, and added at 50° C. The solution was heated to 90° C. and maintained at that temperature overnight. After the mixture was cooled to room temperature, the precipitate was collected and acidified with concentrated HCl to a pH=2.0. The white precipitate was collected, dried and heated overnight at 200° C. under vacuum. The material was sublimed at 240° C. and recrystallized from a mixture of toluene and dioxane by boiling in toluene and adding dioxane to cleanness to obtain 6.08 g (20%) of DBBPDA.

Product properties: mp=249°–251° C.; $^1$H-NMR (DMSO-$d_6$) δ8.15 (s, 2H, aromatic), 8.64 ppm (S, 2H, aromatic); IR (KBr) 1841, 1779 (anhydride), and 597 cm$^{-1}$ (C—Br); Calculated $C_{16}H_4Br_2O_6$: C-42.51%, H-0.89%; Analyzed C-42.04%, H-0.96%.

Example 24

This example illustrates the preparation of 4-trifluoromethyl-5-nitro-1,2-dimethylbenzene.

A mixture of 50.00 g (0.18 mol) of 4-iodo-5-nitro-1,2-dimethylbenzene, 98.00 g (0.72 mol) of sodium trifluoroacetate, 75.00 g (0.39 mol) of CuI, 400 ml of DMF, and 80 ml of toluene were added to a three-necked, 1 liter, round-bottomed flask fitted with a nitrogen inlet pipet, a Dean-Stark trap, and a mechanical stirrer. The mixture was heated to 130° C. under nitrogen. After 75 ml of toluene was removed from the Dean-Stark trap, the temperature of the oil bath was then increased to 170° C. and kept at this temperature for 6 hr. After the mixture cooled to room temperature, it was poured into an excess of water and the precipitate collected and extracted with ether. After the solvent was removed, 35 g of crude dark brown liquid was obtained and directly used for the next reduction step without further purification.

Product properties: $^1$H-NMR (CDCl$_3$) δ7.66 (s, 1H, aromatic), 7.53 (s, 1H, aromatic), 2.36 ppm (s, 6H, CH$_3$); IR (neat) 1522, 1347 (NO$_2$), 1151 and 1136 cm$^{-1}$ (CF$_3$); Calculated C$_9$H$_8$F$_3$NO$_2$: C-49,32%, H-3.68%; Analyzed C-49.60%, H-3.82%.

Example 25

This example illustrates the preparation of 4-trifluoromethyl-5-amino-1,2-dimethylbenzene.

A mixture of 35.0 g of crude 4-trifluoromethyl-5-nitro-1,2-dimethylbenzene, 4.50 g of activated carbon, 0.20 g of FeCl$_3$ o6H$_2$O, and 100 ml of methanol was heated at reflux for 15 min. Hydrazine monohydrate (11.7 ml, 12.07 g, 24 mmol) was then added dropwise over 1 hr. The mixture was kept at reflux overnight. After the mixture cooled to room temperature, the carbon black was removed by filtration. After the solvent was removed, the dark brown liquid was distilled under vacuum to give the named compound.

Product properties: $^1$H-NMR (CDCl$_3$) δ7.14 (s, 1H, aromatic), 6.53 (s, 1H, aromatic), 3.69 (s, 2H, NH$_2$), 2.17 (s, 3H, CH$_3$), 2,12 ppm (s, 3H, CH$_3$); IR (neat) 3502, 3407 (NH$_2$), 1277, 1154, 1124 and 1109 cm$^{-1}$ (CF$_3$).

Example 26

This example illustrates the preparation of 4-trifluoromethyl-5-iodo-1,2-dimethylbenzene.

4-trifluoromethyl-5-amino-1,2-dimethylbenzene (34.02 g, 0.18 mol) was dissolved in a warm mixture of 100 ml of concentrated HCl and 100 ml of water. After the solution was cooled to 0° C., a cooled solution of 12.74 g (0.18 mol) of sodium nitrite in 30 ml of water was added dropwise so that the solution remained below 10° C. The insoluble material was removed by filtration to give a clear diazonium salt solution which was then added dropwise to a solution of 40.00 g (0.24 mol) of potassium iodide in 400 ml of water at 10° C. The mixture was stirred for 30 min. and then warmed to room temperature. The precipitate was collected and recrystallized from ethanol/water by dissolving in ethanol and adding water to cloudiness to obtain the product in 70% yield, with a melting point of 51°– 53° C.

Product properties: $^1$H-NMR (CDCl$_3$) δ7.75 (s, 1H, aromatic), 7.36 (s, 1H, aromatic), 2.23 ppm (s, 6H, CH$_3$); IR (KBr) 1298, 1151, 1121 and 1106 cm$^{-1}$ (CF$_3$); Calculated C$_9$H$_8$F$_3$I: C-36.03%, H-2.69%; Analyzed 35.98%, H-2.72%.

Example 27

This example illustrates the preparation of 2,2'-bis(trifluoro)-4,4',5,5'-tetramethylbiphenyl.

A mixture of 30.00 g (0.10 mol) of 4-trifluoromethyl-5-iodo-1,2-dimethylbenzene, 25.00 g of activated copper, and 85 ml of DMF was heated at reflux for 36 hrs. After cooling to room temperature, the mixture was filtered to remove copper. The filtrate was poured into an excess amount of water and the precipitate collected and recrystallized from ethanol in 73% yield with a melting point of 114°–116° C.

Product properties: $^1$H-NMR (CDCl$_3$) δ7.00 (s, 2H, aromatic), 7.45 (s, 2H, aromatic), 2,33 (s, 6H, CH$_3$), 2.29 ppm (s, 6H, CH$_3$); IR (KBr) 1258, 1164, 1146 and 1131 cm$^{-1}$ (CF$_3$); Calculated C$_{18}$H$_{16}$F$_6$: C-62.43%, H-4.66%; Analyzed C-62.53%, H-4.74%.

Example 28

This example illustrates the preparation of 2,2'-bis(trifluoro)-4,4',5,5'-biphenyltetracarboxylic dianhydride (TFB-PDA).

A solution of 6.92 g (0.02 mol) of 2,2'-bis(trifluoro)-4,4',5,5'-tetramethylbiphenyl, 240 ml of pyridine, and 40 ml of water were added to a three-necked, 500 ml, round-bottomed flask fitted with a mechanical stirrer and a condenser. The solution was heated to 90° C. Potassium permanganate (28.44 g, 0.180 mol) was added in several portions. Each portion was added after no purple color was observed in the solution. After the mixture was stirred at 90° C. for 6 hr., the hot mixture was then filtered to remove MnO$_2$. The MnO$_2$ was washed with hot water several times. The solvents of the combined filtrate were removed under reduced pressure to give a white residue which was dissolved in a solution of 8.00 g of NaOH in 200 ml of water. Potassium permanganate (13.60 g, 0.086 mol) was added to the solution at 90° C. After the mixture was refluxed for 8 hrs, the excess potassium permanganate was destroyed by adding ethanol to the mixture. The MnO$_2$ was removed from the hot mixture by filtration and washed with hot water. The combined filtrate was concentrated to 80 ml and acidified to pH=2.0 with concentrated HCl. The white precipitate was collected and dried to give 2,2'-bis(trifluoro)-4,4',5,5'-biphenyltetracarboxylic acid which was then heated to 200° C. in a flask under vacuum overnight and finally sublimed at 240° C. to give a white powder.

Product properties: mp=209°–211° C. (toluene), $^1$H-NMR (acetone-d$_6$)δ8.66 (s, 2H, aromatic), 8.29 ppm (s, 2H, aromatic); IR (KBr) 1860, 1797 (anhydride), 1251, 1171, 1146 and 1126 cm$^{-1}$ (CF$_3$); Calculated C$_{18}$H$_4$F$_6$O$_6$ C-50.25%, H-0.94%; Analyzed C-49.93%, H-0.91%.

Example 29

This example illustrates the preparation of tetra(n-butyl)2,2'-dibromo-4,4',5,5'-biphenyltetracarboxylate.

A mixture of 13.81 g (0.03 mol) of 2,2'-dibromo-4,4',5,5'-biphenyltetracarboxylic dianhydride, 80 ml. of n-butanol, 70 ml. of toluene, 1.5 ml. of concentrated H$_2$SO$_4$ were added into a on-necked, 300 ml. round-bottomed flask fitted with a Dean-Start trap. The mixture was heated at reflux conditions overnight. After the solution was cooled, washed with water, and separated from the water, the solvents were removed to give 21.70 g (99%) of a colorless, viscous liquid.

Product properties: IR(neat) 1731 (C=O) and 1285 cm$^{-1}$ (C—O); $^1$H-NMR (CDCl$_3$) δ7.96 (s, 2H, aromatic) 7.56 (s, 2H, aromatic), 4.35–4.24 (m, 8H, —COO—CH$_2$—CH$_2$—CH$_2$—CH$_3$), 1.75–1.64 (m, 8H, —COO—CH$_2$—CH$_2$—CH$_2$—CH$_3$), 1.50–1.35 (m, 8H, —COO—CH$_2$—CH$_2$—CH$_2$—CH$_3$), and 0.98–0.87 ppm (m, 12H, —COO— CH$_2$—CH$_2$—CH$_2$—CH$_3$).

Example 30

To a 100 ml., 3-necked, round-bottomed flask equipped with a nitrogen inlet tube, an addition funnel and a condenser, 3.56 g (5.00 millimoles) of the dibromo tetraester of Example 7, 40 ml. of toluene, 10 ml of 2M Na$_2$CO$_3$ (0.02 moles) and 0.35 g (0.30 millimoles) of Pd(PPh$_3$)$_4$ were added under nitrogen. The mixture was vigorously stirred for 20 minutes under nitrogen, followed by the addition of a solution of 1.82 g (15.00 millimoles) of phenylboric acid in 8 ml. of ethanol under nitrogen. The mixture was heated to reflux for 24 hours under nitrogen. After the mixture was cooled to room temperature, 2.5 ml. of 30% $H_2O_2$ was carefully added and the mixture stirred for 1 hr. The mixture was filtered to remove insoluble materials, and the organic layer of the filtrate separated from the aqueous layer, and washed several times with water. The solvents were removed to obtain 3.07 g (87%) of a brown viscous liquid.

Product properties: IR(neat) 1726 (C=O), 1288 and 1242 cm$^{-1}$ (C—O); $^1$H-NMR (CDCl$_3$) $\delta$7.83 (s, 2H, aromatic), 7.46 (s, 2H, aromatic), 2.13 (t, 2H, aromatic), 7.00 (t, 4H, aromatic), 6.51 (d, 4H, aromatic), 4.36–4.26 (m, 8H, —COO—$\underline{CH_2}$—CH$_2$—CH$_2$—CH$_3$), 1.76–1.66 (m, 8H, —COO—CH$_2$—$\underline{CH_2}$CH$_2$—CH$_3$), 1.48–1.34 (m, 8H, —COO—CH$_2$—$\underline{CH_2}$—CH$_2$—$_{CH3}$), and 0.99–0.89 ppm (m, 12H, —COO—CH$_2$—CH$_2$—CH$_2$—$\underline{CH_3}$).

Example 31

Preparation of 2,2'-diphenyl-4,4',5,5'-biphenyltetracarboxylic dianhydride.

The brown liquid of Example 8 was dissolved in 45 ml. of ethanol in a 100 ml. flask with 3.40 g of KOH. The solution was heated to reflux for 3 hours. The white precipitate was collected by filtration, dissolved in water and acidified with concentrated HCl to a pH=1.0. The white precipitate was collected by filtration and dried at 200° C. overnight, followed by sublimation at 270° C. under vacuum to obtain 1.74 g (90%) of a light yellow powder which was then recrystallized from acetic acid/acetic anhydride to give a colorless crystal.

Product properties: mp=274°–276° C.; IR (KBr) 1842 and 1780 cm$^{-1}$ (anhydride); $^1$H-NMR (DMSO) $\delta$8.34 (s, 2H, aromatic), 7.80 (s, 2H, aromatic), 7.24 (t, 2H, aromatic), 7.07 (t, 4H, aromatic), and 6.54 ppm (d, 4H, aromatic).

Analytical composition: calculated for $C_{28}H_{14}O_6$ (75.33%-C, 3.16%-H), and (74.88%-C, 3.40 -H) found.

Example 32

This example illustrates the preparation of a homopolyimide of 2,2'-dibromo-4,4',5,5'-biphenyltetracarboxylic dianhydride (DBBPDA) and 2,2'-bis(trifluoromethyl)-4,4'-diaminobiphenyl (TFMB).

1.70 millimoles of DBBPDA was added to a stirred solution of 1.70 millimoles of TFMB in 13.1 g of m-cresol (solid content 10% weight per weight of solvent) containing 0.07 g of isoquinoline (optional) under N$_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol, and dried under reduced pressure at 150° C. for 24 hours.

Polymer properties: [$\eta$] at 30.0° C. in NMP=3.40 dl/g; T$_g$ (TMA)=330° C.; CTE=1.34×10$^{-5}$ 1/° C.

Example 33

This example illustrates the preparation of a homopolyimide of 2,2'-bis(trifluoromethyl)-4,4',5,5'-biphenyltetracarboxylic dianhydride (TFBPDA) and 2,2'-bis(trifluoromethyl)-4,4'-diaminobiphenyl (TFMB).

1.70 millimoles of TFBPDA was added to a stirred solution of 1.70 millimoles of TFMB in 12.7 g of m-cresol (solid content 10% weight per weight of solvent) containing 0.07 g of isoquinoline (optional) under N$_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol, and dried under reduced pressure at 150° C. for 24 hours.

Polymer properties: [$\eta$] at 30.0° C. in NMP=4.83 dl/g; T$_g$ (TMA)=330° C.; T(−2%)/N$_2$=532° C.; CTE=1.88×10$^{-5}$ 1/°C.; UV data-transparency onset-350 nm and maximum transparency=90%.

Example 34

This example illustrates the preparation of a homopolyimide of 2,2'-diphenyl-4,4',5,5'-biphenyltetracarboxylic dianhydride (DPBPDA) and 2,2'-bis(trifluoromethyl)-4,4'-diaminobiphenyl (TFMB).

3.00 millimoles of DPBPDA was added to a stirred solution of 3.00 millimoles of TFMB in 23.0 g of m-cresol (solid content 10% weight per weight of solvent) containing 0.07 g of isoquinoline (optional) under N$_2$ at ambient temperature. After the solution was stiffed at 50° C. for 3 hours, it was heated to near 200° C. and maintained at that temperature for 3 hours. During this time, the water of imidization was allowed to distill from the reaction mixture. After the solution was allowed to cool to ambient temperature, it was diluted with 20 ml of m-cresol and then slowly added to 1 liter of vigorously stirred 95% ethanol, and dried under reduced pressure at 150° C. for 24 hours.

Polymer properties: [$\eta$] at 30.0° C. in NMP=1.87 dl/g; T$_g$ (TMA)=340° C.; T(−5%)/N$_2$=543° C.; CTE=1.98×10$^{-5}$ 1/°C.

Example 35

This example illustrates the preparation of a copolyimide of 2,2'-dibromo-4,4',5,5'-biphenyltetracarboxylic dianhydride (DPBPDA) and 2,2' -bis(trifluoromethyl)-4,4'-diaminobiphenyl (TFMB) and pyromellitic dianhydride (PMDA).

1.389 g (3.07 millimoles) of DBBPDA was added to a stirred solution of 1.968 g (6.15 millimoles) of TFMB in 33.6 g of m-cresol (solid content 10% weight per weight of solvent) containing 0.15 g of isoquinoline (optional) under N$_2$ at ambient temperature. After the solution was stirred for 2 hours, it was heated to near 200° C. and maintained at that temperature for 3 hours. During this time, the water of imidization was allowed to distill from the reaction mixture. After the solution was allowed to cool to ambient temperature, 0.278 g (0.614 millimoles) of DBBPDA, 0.536 g (2.458 millimoles) of PMDA, and 8.10 g of m-cresol were added to the oligomer solution. After the mixture was stirred for 2 hours, it was heated to near 200° C. and maintained at that temperature for 3 hours. During this time, the water of imidization was allowed to distill from the reaction mixture. After the solution was allowed to cool to ambient temperature, it was diluted with 20 ml of m-cresol and then slowly added to 1 liter of vigorously stirred 95% ethanol, and dried under reduced pressure at 150° C. for 24 hours.

Polymer properties: [$\eta$] at 30.0° C. in NMP=3.12 dl/g.

Polyimides based on the above diphenyl dianhydride have been characterized as follows in Table I.

TABLE I

| Diamine | [η] dl/g (NMP @ 30° C.) | $T_g$ (°C.) TMA @ 3MPa | 5% wt. loss (°C. in $N_2$) |
|---|---|---|---|
| (structure with Br, Br) | 1.81 | 329 | 532 |
| (structure with $CF_3$, $CF_3$) | 1.87 | 340 | 543 |
| (structure with $CH_3$, $CH_3$) | 2.38 | 325 | 542 |

Discussion

While numerous examples have been illustrated to show how to make soluble polyimides and enable those skilled in the art to practice the invention, it is well known that other polyimides, not specifically detailed in the previous examples, can be synthesized by well-known techniques in the art. In general, the principles for preparing soluble polyimides are known in the art, as taught in, for example, the general compilation of the "Proceedings of the Symposium on Structure-Solubility Relationships in Polymers", edited by Harris and Seymour, and published by Academic Press in 1977. In particular, the papers entitled *Structure-Solubility Relationships in Polyimides*, by Harris and Lanier, and *Solubility-Structure Study of Polyimides*, by St. Clair, St. Clair and Smith, the teachings of which are herein by incorporated by reference, are germane to the teachings which have been used to attain solubility in polyimides while maintaining their desirable high temperature characteristics.

While broad generalities, associated with structural effects on solubility are impossible, the majority of approaches have included: (1) incorporation of flexible or non-symmetrical, thermally-stable linkages in the backbone; (2) the introduction of large polar or non-polar substituents along the polymer backbone; and (3) the disruption of symmetry and recurrence regularity through the copolymerization of two dianhydrides or two diamines. Recently, it has been discovered that soluble polyimides can also be prepared through the use of substituted 4,4'-diaminobiphenyls. The use of such diamines results in twisted polyimide backbones that do not pack well in the solid state. Thus, they are readily solubilized in organic solvents, as taught for example by the teachings of Harris in U.S. Pat. No. 5,071,997, published Dec. 10, 1991, which is herein by incorporated fully by reference, or as supplemented by the teachings of Harris in pending application Ser. No. 08/009,718 wherein the combination of appropriate diamines with 2,2'-bis(3,4-dicarboxylphenyl)-1,1,1,3,3,3-hexafluoropropane dianhydride (6FDA) has been found to produce polyimides particularly useful for this invention in that such polyimides are readily soluble in ketones and ethers, or by any other methods used by those skilled in the art.

Additionally, the making of films is also well-known in the art, and for example, would include the preparative steps of preparing an approximately 2–12 weight percent solution of one of the polyimides in a solvent which is filtered, and a thin film cast onto a substrate with for example, a doctors knife, and the solvent allowed to evaporate, or by a spin coating technique at between 500–2,000 rpm. It is appreciated that other techniques are known in the art.

Typical effective solvents used in the above film-making process would include at least phenolics, and preferably polar aprotic solvents, and most preferably ketones and ethers. The list provided is merely illustrative of a great many other solvents which are applicable to the instant invention.

The critical step is that the polyimide films are cast from polyimides which are soluble in the imide form, and not from polyamic acid precursors. The benefit of using the soluble polyimides is that better reproducible in-plane orientation is achieved when films are prepared in this manner than when films are prepared from the corresponding polyamic acid precursor.

The film is typically dried under reduced pressure for one hour at ~80° C., ramped to ~100° C. for an additional two hours, followed by heating the sample at ~150° C. for an additional five hours. It is well-known in the art that the times and temperatures used in the above illustrative example are dependent upon the composition of the synthesized polyimide and the conditions would be adjusted accordingly.

The ensuing refractive indices were generated for the following polyimides and copolyimides comprised of the dianhydrides of formulas (I), (II), and preferredly (X)

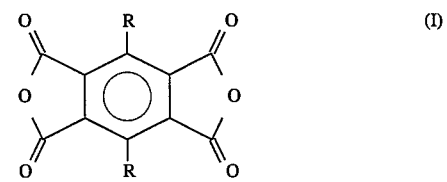

(I)

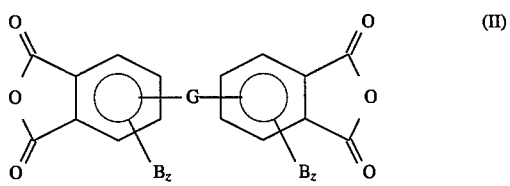

(II)

-continued

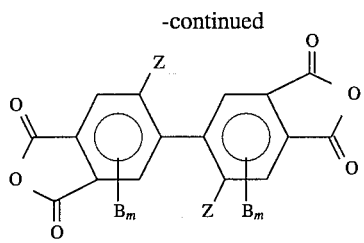

and monoaromatic and polyaromatic diamines of formula (III)

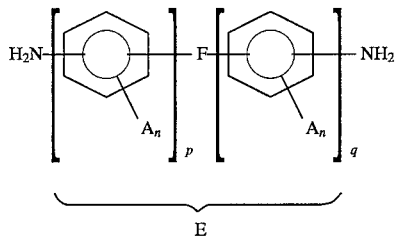

and wherein R, G, F, $B_m$, $B_z$, $A_n$, p and q have the previously indicated meanings and E represents the structure between the amino groups of the diamine of formula (III) as shown in the respective columns of Tables I–V, except when G is indicated to be pyromellitic dianhydride, in which case, G is the dianhydride, and not merely indicative of the group G within the dianhydride.

The choice of substituents G and F relate to the ability to affect the linearity and rigidity of the polymer backbone, and thus, the polymer's in-plane orientation in thin films. This in-plane orientation, critically affects the anisotropy of the film's refractive index. In effect, higher in-plane orientation results in a higher in-plane refractive index. Thus, backbones that are highly linear and rigid display high negative birefringence.

Specifically, Table I indicates the wide variety of polyimide and copolyimide films which can be prepared with negative birefringence without the need of having to resort to either uniaxial or biaxial stretching to achieve the necessary orientation for birefringence. By careful selection of the appropriate diamines and dianhydrides, as illustrated by the Markush groups G, F, E, $B_m$, $B_z$, $A_n$, p, q and R, the negative birefringence is tailorable for the targeted application which may have the need for a film of predetermined thickness of from 0.2–20.0 µm.

The polyimides shown in Table I were synthesized using preparative methods outlined in the previous examples and appropriate quantifies of reactant diamines and dianhydrides as would be obvious in light of the previous discussion.

TABLE I

Refractive Indices of Segmented Rigid-Rod Polyimides

| G | E | $n_{\parallel}$ | $n_{\perp}$ | $\Delta n$ |
|---|---|---|---|---|
| 6FDA | PPD | | | |
| 6FDA (-C(CF$_3$)$_2$-) | TFMB (phenyl) | 1.593 | 1.568 | 0.025 |
| 6FDA (-C(CF$_3$)$_2$-) | DMB (biphenyl with CF$_3$, CF$_3$) | 1.568 | 1.522 | 0.046 |
| BPDA | DMB (biphenyl with CH$_3$, CH$_3$) | | | |
| covalent bond | DMB (biphenyl with CH$_3$, CH$_3$) | 1.757 | 1.600 | 0.157 |
| 6FDA (-C(CF$_3$)$_2$-) | DCM (biphenyl with CH$_3$, CH$_3$) | 1.599 | 1.559 | 0.040 |
| 6FDA | | | | |

TABLE I-continued
Refractive Indices of Segmented Rigid-Rod Polyimides
| G | E | $n_\parallel$ | $n_\perp$ | $\Delta n$ |
|---|---|---|---|---|
| 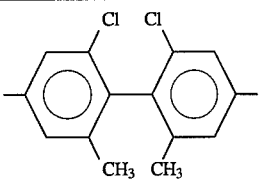 6FDA | 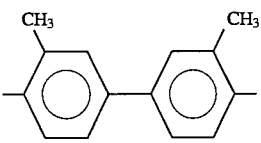 OTOL | 1.589 | 1.557 | 0.032 |
| 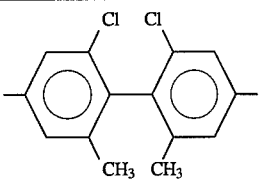 6FDA | 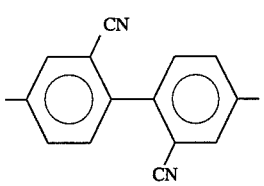 DCB | 1.604 | 1.554 | 0.050 |
| 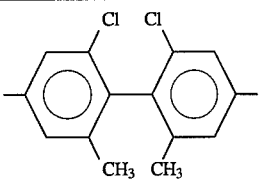 6FDA | 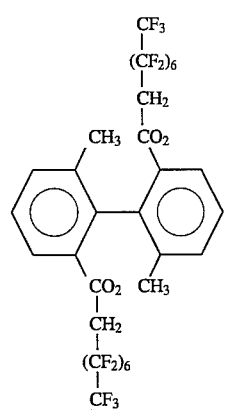 C8F | 1.625 | 1.578 | 0.047 |
| 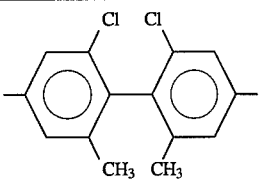 BPDA | 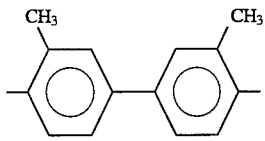 OTOL | 1.482 | 1.469 | 0.013 |
| covalent bond | 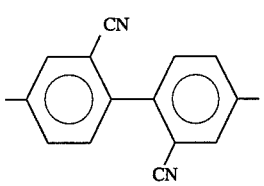 DABMB | 1.760 | 1.611 | 0.149 |
| 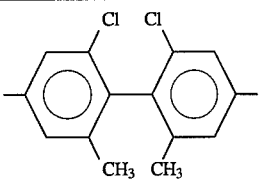 BPDA | 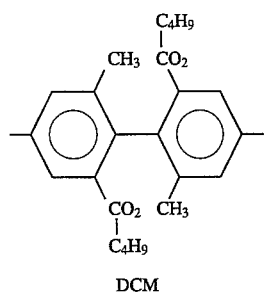 DCM | 1.593 | 1.585 | 0.008 |

TABLE I-continued
Refractive Indices of Segmented Rigid-Rod Polyimides
| G | E | $n_{\parallel}$ | $n_{\perp}$ | $\Delta n$ |
|---|---|---|---|---|
| covalent bond | 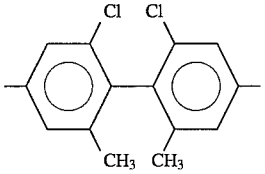 <br> DCM | 1.709 | 1.598 | 0.112 |
| BTDA | | | | |
| $-\overset{\overset{O}{\|\|}}{C}-$ |  <br> DCM | 1.683 | 1.623 | 0.060 |
| ODPA | | | | |
| $-O-$ | 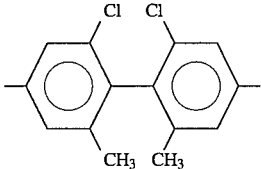 <br> 40% DCB | 1.679 | 1.633 | 0.046 |
| BPDA | | | | |
| covalent bond |  <br> 60% OTOL | 1.765 | 1.624 | 0.141 |
| BPDA | 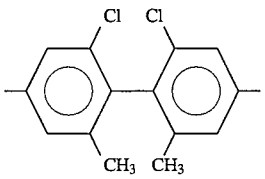 <br> 70% OTOL | | | |
| covalent bond | 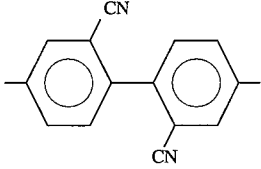 <br> 30% DCB | 1.770 | 1.609 | 0.161 |
| BPDA | 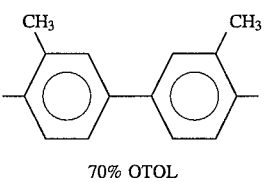 <br> 80% OTOL | | | |

TABLE I-continued

Refractive Indices of Segmented Rigid-Rod Polyimides

| G | E | $n_\parallel$ | $n_\perp$ | $\Delta n$ |
|---|---|---|---|---|
| covalent bond | [3,3'-dimethyl biphenyl structure] 20% DCB [2,2'-dicyano biphenyl structure] | 1.769 | 1.606 | 0.163 |
| BPDA | 60% OTOL | | | |
| covalent bond | [3,3'-dimethyl biphenyl structure] 40% PPD | 1.775 | 1.600 | 0.175 |
| 6FDA | [phenylene structure] 70% TFMB | | | |
| $-\underset{\underset{CF_3}{\vert}}{\overset{\overset{CF_3}{\vert}}{C}}-$ | [2,2'-bis(trifluoromethyl) biphenyl structure] 30% BDAF | 1.568 | 1.535 | 0.033 |
| DSDA | [BDAF structure with CF₃ groups and ether linkages] TFMB | | | |
| $-\underset{\underset{O}{\overset{\Vert}{}}}{\overset{\overset{O}{\Vert}}{S}}-$ | [2,2'-bis(trifluoromethyl) biphenyl structure] 70% TFMB | 1.617 | 1.591 | 0.026 |
| BPDA | | | | |
| covalent bond | [2,2'-bis(trifluoromethyl) biphenyl structure] 30% DCB | 1.749 | 1.550 | 0.199 |

TABLE I-continued

Refractive Indices of Segmented Rigid-Rod Polyimides

| G | E | $n_\parallel$ | $n_\perp$ | $\Delta n$ |
|---|---|---|---|---|
| OPDA —O— | TFMB (biphenyl with CN at 2,2' positions) | | | |
| PMDA | DABMB (biphenyl with CF₃ at 2,2' positions) | 1.639 | 1.602 | 0.037 |
| BTDA | TFMB (biphenyl with CH₃ and CO₂C₄H₉ substituents) | 1.632 | 1.554 | 0.078 |
| BPDA $-\overset{O}{\underset{\parallel}{C}}-$ | 70% OTOL (biphenyl with CF₃ at 2,2' positions) / 30% PPD (biphenyl with CH₃ groups, and phenyl) | 1.656 | 1.565 | 0.091 |
| BPDA covalent bond | | 1.777 | 1.598 | 0.179 |
| BPDA covalent bond | TFMB (biphenyl with CF₃ at 2,2' positions) | 1.634 | 1.540 | 0.094 |

Figure 1:
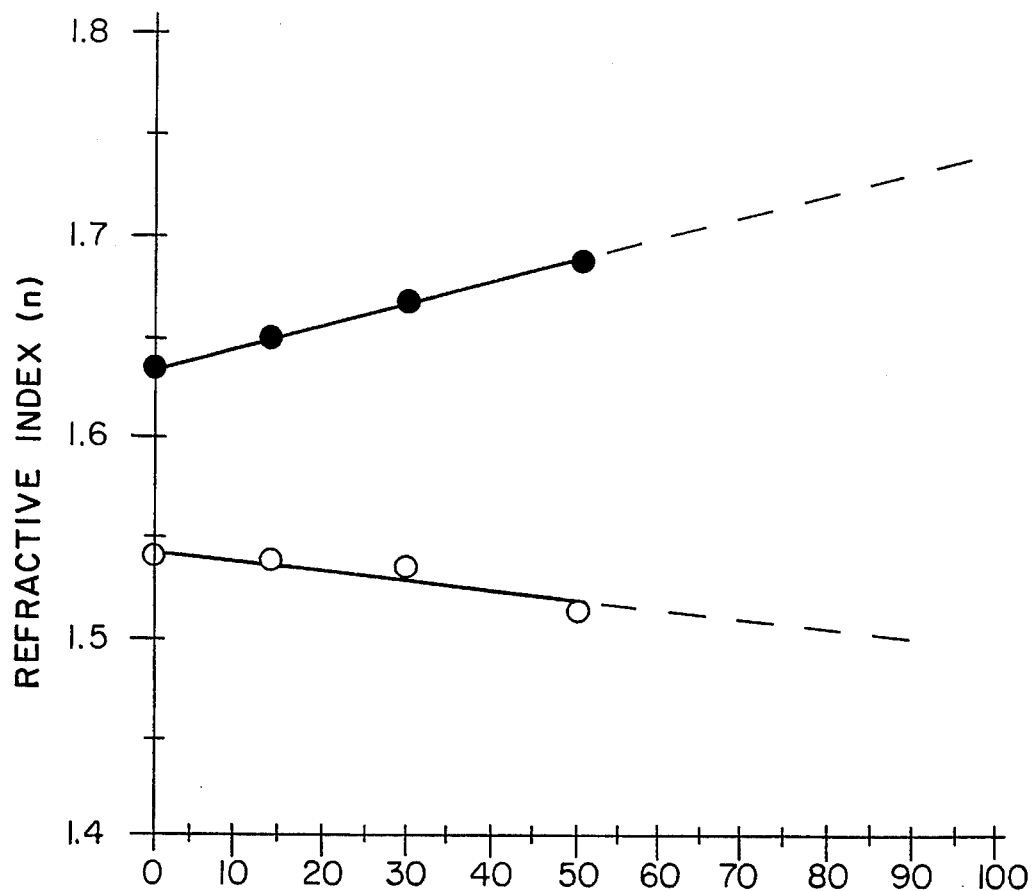
FIG. 1 is a plot of refractive index vs. copolyimide composition [3,3',4,4'-biphenyltetracarboxylic dianhydride (BPDA)-2,2'-bis(trifluoromethyl)-4,4'-diaminobiphenyl (TFMB)]$_x$-[pyromellitic dianhydride (PMDA)-2,2'-bis(trifluoromethyl)-4,4'-diaminobiphenyl (TFMB)]$_y$, wherein the content of the copolyimide is changed as x varies from 100 to 0 while y varies correspondingly from 0 to 100.

By careful selection of the appropriate diamines and dianhydrides, the negative birefringence is tailorable for the targeted application for films of predetermined thickness. As seen in Table II, by varying composition of the dianhydride of the polyimide, through copolymers, the negative birefringence is changed as the polymer becomes less rigid, as shown when this ratio is varied from the copolyimide to the homopolymer as follows: [(BPDA-TFMB)$_{0.5}$ -(PMDA-TFMB)$_{0.5}$] to [(BPDA-TFMB)$_{0.7}$-(PMDA-TFMB)$_{0.3}$] to [(BPDA-TFMB)$_{1.0}$-(PMDA-TFMB)$_{0.0}$]. This effect is additionally shown in FIG. 1.

the copolyimide to the homopolymer as follows: [(BPDA-TFMB)$_{0.5}$-(PMDA-TFMB$_{0.5}$] to [(BPDA-TFMB)$_{0.7}$-(PMDA-TFMB)$_{0.3}$] to [(BPDA-TFMB)$_{1.0}$-(PMDA-TFMB)$_{0.0}$] and wherein CTE is the coefficient of thermal expansion.

TABLE II

Refractive Indices of Segmented Rigid-Rod Copolyimides

| Dianhydride | Diamine | Ratio | $n_{\|}$ | $n_{\perp}$ | $\Delta n$ |
|---|---|---|---|---|---|
| BPDA 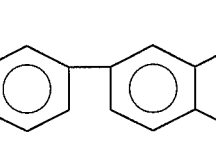 | TFMB 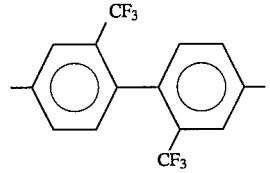 | 50% | 1.694 | 1.514 | 0.180 |
| PMDA 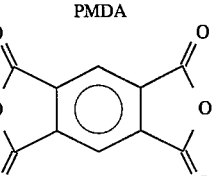 | TFMB 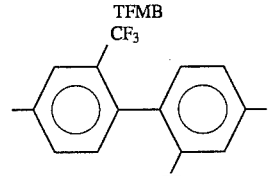 | 50% | | | |
| BPDA 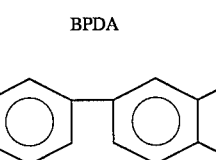 | TFMB 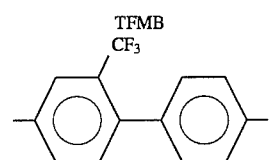 | 70% | 1.674 | 1.547 | 0.127 |
| PMDA 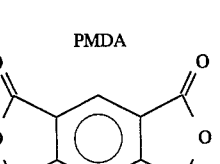 | TFMB 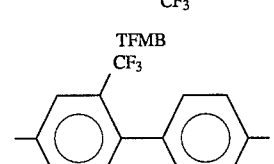 | 30% | | | |
| BPDA 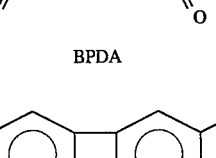 | TFMB 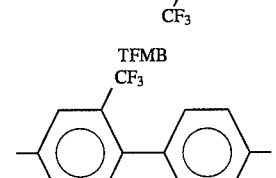 | | 1.634 | 1.540 | 0.094 |

As additionally shown by the same compositional sequence variation shown in the previous table, the backbone rigidity is increased with increasing amounts of PMDA, which increases the in-plane orientation, and therefore, increases the negative birefringence of the film as shown in Table III wherein the composition is varied from

TABLE III

Refractive Indices of Segmented Rigid-Rod Copolyimides

| Dianhydride | Diamine | Ratio | $T_g$ | CTE × $10^{-6}$ | Δn |
|---|---|---|---|---|---|
| BPDA 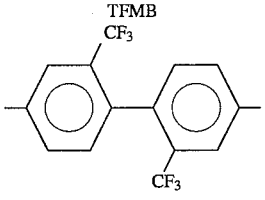 | TFMB 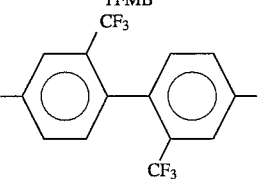 | 50% | 340° C. | 1.38 | 0.180 |
| PMDA 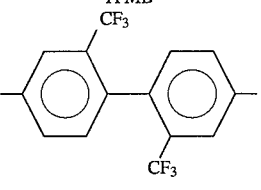 | TFMB | 50% | | | |
| BPDA | TFMB | 70% | 318° C. | 2.62 | 0.127 |
| PMDA | TFMB | 30% | | | |
| BPDA | TFMB | 100% | 290° C. | 6.98 | 0.094 |

The effect of the group G within the dianhydride on the measured values of the refractive indices is shown in Table IV wherein the diamine component of the polyimide is the same and the dianhydride is varied. As shown in the table, reducing the rigidity and linearity between the dianhydride functionality, i.e., moving from top to bottom in the table, will reduce the ultimate film's negative birefringence, thereby enabling a tailoring of the polyimide to the intended application.

TABLE IV

Effect of G on Negative Birefringence

| G | E | $n_\parallel$ | $n_\perp$ | Δn |
|---|---|---|---|---|
| BPDA | TFMB | | | |

TABLE IV-continued

Effect of G on Negative Birefringence

| G | E | $n_\parallel$ | $n_\perp$ | Δn |
|---|---|---|---|---|
| covalent bond | CF₃ 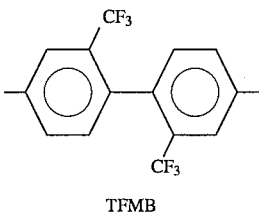 | 1.634 | 1.540 | 0.094 |
| BTDA | TFMB | | | |

TABLE IV-continued

Effect of G on Negative Birefringence

| G | E | $n_\parallel$ | $n_\perp$ | $\Delta n$ |
|---|---|---|---|---|
| $\begin{array}{c}\text{O}\\\|\\-\text{C}-\end{array}$ | | 1.639 | 1.576 | 0.063 |
| 6FDA $\begin{array}{c}\text{CF}_3\\\|\\-\text{C}-\\\|\\\text{CF}_3\end{array}$ | TFMB | 1.568 | 1.522 | 0.046 |
| ODA $-\text{O}-$ | TFMB | 1.639 | 1.602 | 0.037 |

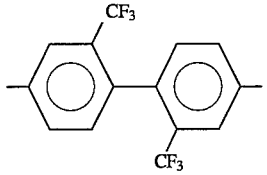

In a corresponding manner, by varying the rigidity and linearity of the diamine in the polyimide, a corresponding effect can be observed as shown in Table V, thereby permitting additional tailoring of the polyimide to fit the targeted application. By including the flexible diamine BDAF in the copolyimide, thereby decreasing the rigidity of the polymeric backbone, the observed value of the negative birefringence is decreased, as expected.

The type and position of the substituent An within the diamine of the present invention can also have a measurable effect on the negative birefringence as shown in Table VI. As shown in the Table, by switching the substituent in the 2 and 2' positions on the aromatic ring on the diamine, for example, from $CF_3$ to $CH_3$, the more electronegative halogen fluorine has a larger effect on the negative birefringence of the film than hydrogen. Additionally, replacing the substituent from a fairly compact methyl radical, to the bulkier alkyl ester, has a pronounced effect on the measured negative birefringence of the polyimide film.

TABLE VI

Effect of $A_n$ on the Negative Birefringence of the Film

| Dianhydride | Diamine | 2- | 2'- | 6- | 6'- | $\Delta n$ |
|---|---|---|---|---|---|---|
| 6FDA | TFMB | $CF_3$ | $CF_3$ | — | — | 0.046 |
| 6FDA | DMB | CH3 | CH3 | — | — | 0.040 |
| 6FDA | DMBMB | $CO_2C_4H_9$ | $CO_2C_4H_9$ | $CH_3$ | $CH_3$ | 0.008 |

And lastly, shown in Table VII, the backbone rigidity effect is shown in the comparison wherein the diamine component of the polyimide is increased from one ring to two rings, i.e. the backbone is made more rigid.

TABLE V

Effect of E on Negative Birefringence

| G | E | $n_\parallel$ | $n_\perp$ | $\Delta n$ |
|---|---|---|---|---|
| 6FDA $\begin{array}{c}\text{CF}_3\\\|\\-\text{C}-\\\|\\\text{CF}_3\end{array}$ | TFMB | 1.567 | 1.525 | 0.042 |
| 6FDA $\begin{array}{c}\text{CF}_3\\\|\\-\text{C}-\\\|\\\text{CF}_3\end{array}$ | 70% TFMB / 30% BDAF | 1.566 | 1.535 | 0.030 |

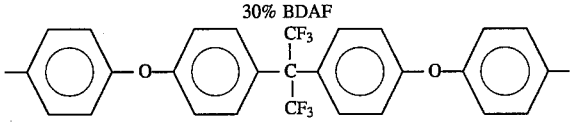

TABLE VII

Negative Birefringence of Polyimide films

| Dianhydride | Diamine | Δn |
|---|---|---|
| | 1-ring | |
| 6FDA | PPD | 0.025 |
| | 2-rings | |
| 6FDA | TFMB | 0.046 |

Figure 5:
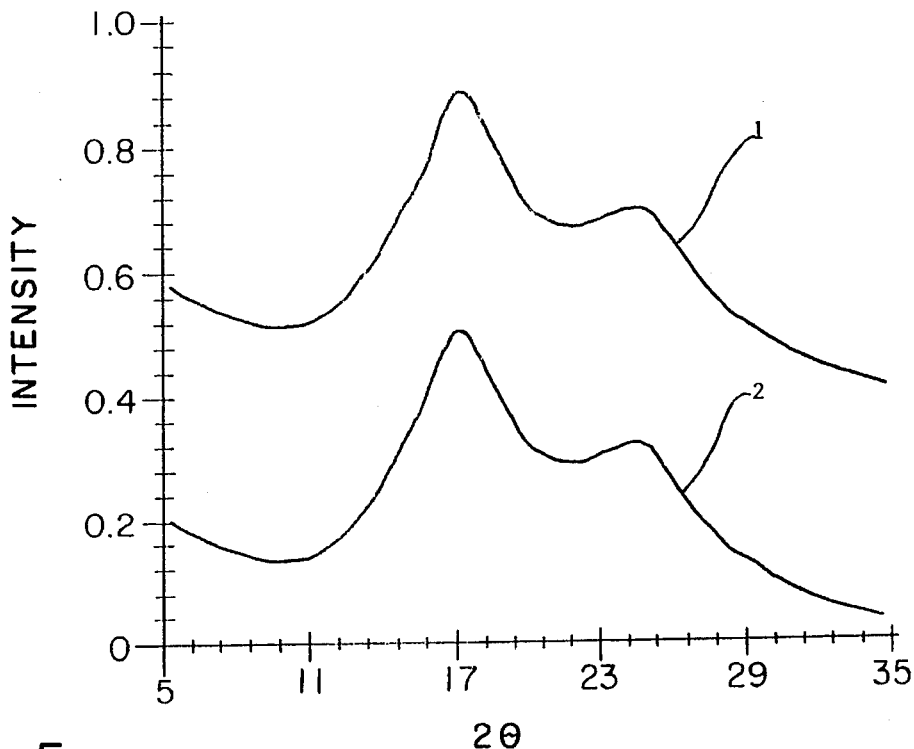
FIG. 5 is a Wide Angle X-Ray Diffraction (WAXD) pattern obtained via transmission mode for a (BPDA-TFMB)$_{0.5}$-(PMDA-TFMB)$_{0.5}$ copolyimide.

Experimental evidence for the conclusions discussed so far are shown in FIGS. 5 and 6, where wide angle X-Ray Diffraction (WAXD) patterns were obtained for the transmission and reflection modes for a $(BPDA-TFMB)_{0.5}$-$(PMDA-TFMB)_{0.5}$ copolyimide and compared to the patterns obtained from a highly oriented fiber along both the equatorial and meridian directions, respectively. This highly oriented fiber was obtained using the teachings of Cheng, Wu, Eashoo, Shu and Harris in *Polymer*, 32, 1803–1810 (1991) which is hereinby incorporated by reference. The results indicate that the c-axis in the ordered structure is parallel to the film surface. From the viewpoint of chain rigidity and linearity, it is natural to extend this in-plane orientation from the c-axis of the crystal to the molecular chain axis.

This validity of this extrapolation was studied via fourier transform infrared (FTIR) spectroscopy. The fingerprint frequencies are usually identified through the symmetric and asymmetric stretching and in-plane and out-of-plane bending vibrational modes. For example, the 1778 $cm^{-1}$ absorption band represents symmetric and asymmetric stretching vibration, and the 738 $cm^{-1}$ absorption band represents the in-plane and out-of-plane bending vibrations of the carbonyl groups. These modes may be used to study chain orientation utilizing polarized infrared radiation. The stretching (1778 $cm^{-1}$) band possesses a transition moment vector lying along the imide plane and thus parallel to the chain direction, while the in-plane and out-of-plane bending of the carbonyl groups (738 $cm^{-1}$) has a transition moment vector that is perpendicular to the imide plane. In fact, if this transition vector is perfectly aligned perpendicular to the film surface, no absorbance of the polarized infrared radiation should be observed. As seen in FIG. 8 for the copolyimide films, the 738 $cm^{-1}$ absorption band is relatively weak, (0.14 in arbitrary unit), while the 1778 $cm^{-1}$ band is about 2.5 times stronger than that of the 738 $cm^{-1}$ band. The observations of the weak 738 $cm^{-1}$ band indicates that the imide rings in the films are not perfectly parallel to the film surface. Furthermore, a decrease of the absorbance intensity of this band with increasing PMDA-TFMB composition reveals an enhancement of the in-plane orientation resulting from an increase in the chain rigidity and linearity.

FIG. 9 also shows the in-plane orientation via transmission electron microscopy (TEM) and electron diffraction (ED) methods. In this figure, the BPDA-TFMB thin film is shown after etching in a potassium permanganate/phosphoric acid solution. Fibril type of textures are obvious. The ED pattern indicates that the c-axis of the crystals is parallel to the fibril direction, revealing an in-plane orientation.

What has been shown is the ability to custom tailor polyimide and copolyimide thin films with negative birefringence. The teachings enable one skilled in the art to control the degree of in-plane orientation, thereby controlling the amount of negative birefringence, through selection of groups which affect polymer backbone chain rigidity, chain linearity, and chain symmetry.

In all previous dianhydride examples wherein at least two benzene rings were employed, the dianhydride rings were unsubstituted. What has been unexpected found is that not only do substituents have an effect on the negative birefringence of the polyimide films, but they have a profound influence on the solubility of the polyimides.

Table IX shows the effect of substituents on the negative birefringence of a polyimide film wherein the substituents on the benzene rings are varied, as shown in formula (II), and more specifically in formula (X) when the substituents are in the 2 and 2' positions, along with the diamines of formula (III).

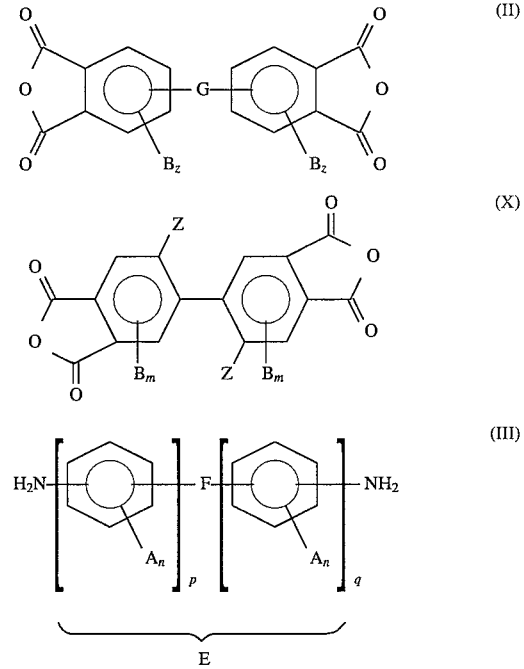

TABLE IX

Effect of $A_n$ Substitution on Dianhydride

| Dianhydride | Diamine | $n_\parallel$ | $n_\perp$ | $\Delta n$ |
|---|---|---|---|---|
| 2,2'-dibromo biphenyl dianhydride | 2,2'-dibromo biphenyl diamine | 1.722 | 1.633 | 0.089 |
| 2,2'-dibromo biphenyl dianhydride | 2,2'-bis(CF₃) biphenyl diamine | 1.633 | 1.558 | 0.075 |
| 2,2'-dibromo biphenyl dianhydride | 3,3'-dimethyl biphenyl diamine | 1.704 | 1.622 | 0.082 |
| 2,2'-dibromo biphenyl dianhydride | 2,2'-dimethyl biphenyl diamine | 1.700 | 1.604 | 0.096 |
| 2,2'-dibromo biphenyl dianhydride | 3,3'-dimethyl biphenyl diamine | 1.704 | 1.622 | 0.082 |
| 2,2'-dibromo biphenyl dianhydride | 2,2'-dichloro-6,6'-dimethoxy biphenyl diamine | 1.676 | 1.603 | 0.073 |
| 2,2'-dibromo biphenyl dianhydride | 2,2'-dichloro-6,6'-dimethyl biphenyl diamine | 1.674 | 1.604 | 0.070 |

TABLE IX-continued

Effect of A_n Substitution on Dianhydride

| Dianhydride | Diamine | $n_\|$ | $n_\perp$ | $\Delta n$ |
|---|---|---|---|---|
| Biphenyl dianhydride with Br, Br substituents | Biphenyl diamine with CN, CN substituents | 1.711 | 1.623 | 0.088 |
| Biphenyl dianhydride with Br, Br substituents | Biphenyl diamine with I, I substituents | 1.737 | 1.653 | 0.084 |
| Biphenyl dianhydride with CF₃, CF₃ substituents | Biphenyl diamine with CN, CN substituents | 1.615 | 1.549 | 0.066 |
| Biphenyl dianhydride with CF₃, CF₃ substituents | Biphenyl diamine with Br, Br substituents | 1.622 | 1.549 | 0.073 |
| Biphenyl dianhydride with CF₃, CF₃ substituents | Biphenyl diamine with I, I substituents | 1.633 | 1.573 | 0.060 |
| Biphenyl dianhydride with CF₃, CF₃ substituents | Biphenyl diamine with CH₃, CH₃ substituents | 1.599 | 1.525 | 0.074 |

TABLE IX-continued

Effect of $A_n$ Substitution on Dianhydride

| Dianhydride | Diamine | $n_\|$ | $n_\perp$ | $\Delta n$ |
|---|---|---|---|---|
| (biphenyl dianhydride with CF₃ substituents) | (biphenyl diamine with CF₃ substituents) | 1.562 | 1.497 | 0.065 |

What is now shown is the ability to further tailor the negative birefringence values of the polyimide film by not only providing substituents on the benzyl rings of the diamine, but also on the benzyl rings of the dianhydrides. Table X shows a comparison of how this additional ring substitution affects the negative birefringence when compared to the unsubstituted dianhydride analog.

TABLE X

Comparison of Substituted vs. Non-Substituted Dianhydrides

| Dianhydride | Diamine | $n_\|$ | $n_\perp$ | $\Delta n$ |
|---|---|---|---|---|
| (biphenyl dianhydride, unsubstituted) | (biphenyl diamine with CF₃ substituents) | 1.634 | 1.540 | 0.094 |
| (biphenyl dianhydride with Br substituents) | (biphenyl diamine with CF₃ substituents) | 1.633 | 1.558 | 0.075 |
| (biphenyl dianhydride, unsubstituted) | (biphenyl diamine with CH₃ substituents) | 1.760 | 1.711 | 0.149 |
| (biphenyl dianhydride with Br substituents) | (biphenyl diamine with CH₃ substituents) | 1.704 | 1.622 | 0.082 |

TABLE X-continued

| Comparison of Substituted vs. Non-Substituted Dianhydrides | | | | |
|---|---|---|---|---|
| Dianhydride | Diamine | $n_{\parallel}$ | $n_{\perp}$ | $\Delta n$ |
| (structure) | (structure) | 1.709 | 1.598 | 0.112 |
| (structure) | (structure) | 1.674 | 1.604 | 0.070 |
| (structure) | (structure) | 1.634 | 1.540 | 0.094 |
| (structure) | (structure) | 1.562 | 1.497 | 0.066 |

What is unexpected about the results is that the solubility of the final polyimide can be significantly enhanced by substitution on the benzyl rings of the dianhydride, particularly when the substitution occurs in the 2 and 2' positions. This is shown in Table XI wherein the dianhydride is represented by formula (X)

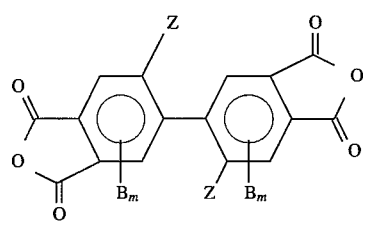
(X)

wherein n is zero and Z is as defined in Table XI, and the diamine is represented formula (XVI)

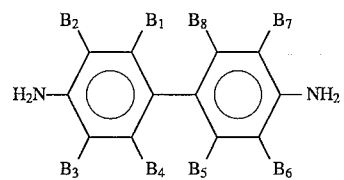
(XVI)

wherein $B_{1-8}$ are defined as listed in Tables XI and XII.

TABLE XI

Polyimide Solubilities

| Z | $B_1$ | $B_2$ | $B_3$ | $B_4$ | $B_5$ | $B_6$ | $B_7$ | $B_8$ | Acetone | THF | DMF | DMSO | DMAc | NMP |
|---|---|---|---|---|---|---|---|---|---|---|---|---|---|---|
| $CF_3$ | Cl | — | — | — | Cl | — | — | — | S | S | S | S | S | S |
| $CF_3$ | Br | — | — | — | Br | — | — | — | S | S | S | S | S | S |
| $CF_3$ | I | — | — | — | I | — | — | — | S | S | S | S | S | S |
| $CF_3$ | $CF_3$ | — | — | — | $CF_3$ | — | — | — | S | S | S | S | S | S |
| $CF_3$ | $CH_3$ | — | — | — | $CH_3$ | — | — | — | I | S | S | S | S | S |
| $CF_3$ | — | $CH_3$ | — | — | — | — | $CH_3$ | — | I | I | I | S | S | S |
| $CF_3$ | $CH_3$ | — | — | Cl | $CH_3$ | — | — | Cl | S | S | S | S | S | S |
| $CF_3$ | Cl | — | OMe | — | Cl | — | OMe | — | S | S | S | S | S | S |
| Ph | Br | — | — | — | Br | — | — | — | I | S | S | S | S | S |
| Ph | $CF_3$ | — | — | — | $CF_3$ | — | — | — | I | S | S | S | S | S |
| Ph | — | $CH_3$ | — | — | — | — | $CH_3$ | — | I | I | I | I | S | S |
| H | — | — | — | — | — | — | — | — | I | I | I | I | I | I |

TABLE XII

Polyimide Solubilities

| | Z | $B_1$ | $B_2$ | $B_3$ | $B_4$ | $B_5$ | $B_6$ | $B_7$ | $B_8$ | Acetone | THF | DMF | DMSO | DMAc | NMP | Phenolic solvents |
|---|---|---|---|---|---|---|---|---|---|---|---|---|---|---|---|---|
| 1 | Br | Cl | — | — | — | Cl | — | — | — | I | S | S | S | S | S | S |
| 2 | Br | Br | — | — | — | Br | — | — | — | I | S | S | S | S | S | S |
| 3 | Br | I | — | — | — | I | — | — | — | I | S | S | S | S | S | S |
| 4 | Br | $CF_3$ | — | — | — | $CF_3$ | — | — | — | S | S | S | S | S | S | S |
| 5 | H | $CF_3$ | — | — | — | $CF_3$ | — | — | — | I | I | I | I | I | I | S |
| 6 | Br | $CH_3$ | — | — | — | $CH_3$ | — | — | — | I | S | S | S | S | S | S |
| 7 | Br | — | $CH_3$ | — | — | — | — | $CH_3$ | — | I | I | I | S | S | S | S |
| 8 | Br | $CH_3$ | — | — | Cl | $CH_3$ | — | — | Cl | I | S | S | S | S | S | S |
| 9 | Br | Cl | — | OMe | — | Cl | — | OMe | — | I | S | S | S | S | S | S |
| 10 | H | Cl | — | OMe | — | Cl | — | OMe | — | I | I | I | I | I | I | S |

The significance of the ability to solubilize polyimides by additionally placing substituents in the 2,2' positions on the dianhydride is easily seen by the comparison of the solubility of the polyimide described in row 4 of Table III wherein $B_1=B_5=CF_3$ and Z=Br. The disubstituted polyimide, in the 2,2' positions of both the diamine and the dianhydride is soluble in solvents such as acetone, THF, DMF, DMSO, DMAc, and NMP. The homolog polyimide, wherein Z is not present, shown in row 5, is soluble only in phenolic solvents.

Additionally, the disubstituted polyimide described in row 9 of Table III, wherein $B_1=B_5=$Cl, $B_3=B_7=OCH_3$ and Z=Br, is soluble in THF, DMF, DMSO, DMAc and NMP. The homolog polyimide, wherein Z is not present, shown in row 10, is insoluble in all organic solvents, except phenolic solvents.

Liquid Crystal Compensator

Figure 2:
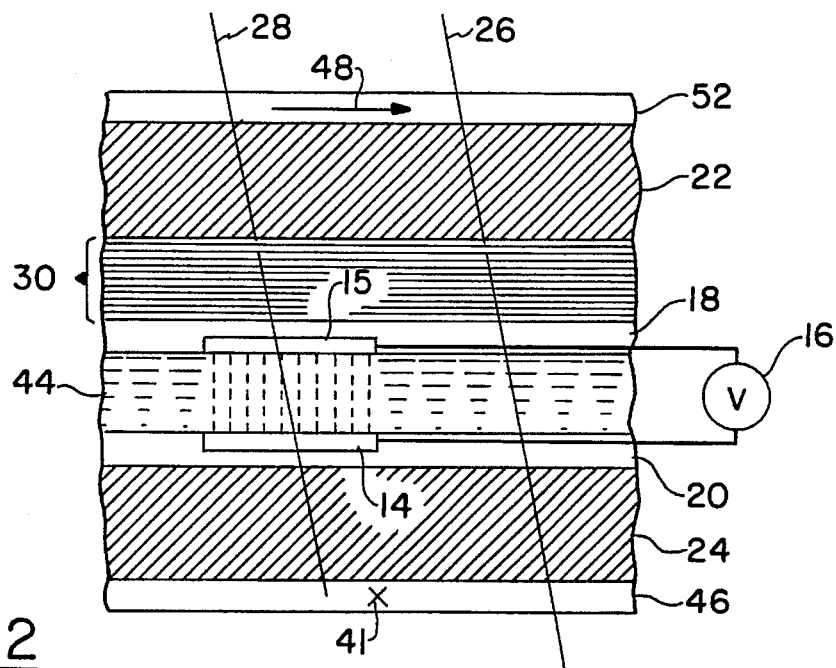
FIG. 2 is a cross-sectional schematic side view of a twisted nematic, transmissive-type liquid crystal display.

FIG. 2 is a cross-sectional schematic side view of a twisted nematic, transmissive type normally white liquid crystal display (LCD) constructed according to the teachings of U.S. Pat. No. 5,196,953, which is hereinby fully incorporated by reference. The display includes a polarizer layer 52, and an analyzer layer 46, between which is positioned a liquid crystal layer 44, consisting of a liquid crystal material in the nematic phase. The polarizer and the analyzer, as is indicated by the symbols 48 (representing a polarization direction in the plane of the drawing) and 41 (representing a polarization direction orthogonal to the plane of the drawing), are oriented with their polarization directions at 90° to one another, as is the case for a normally white display. A first transparent electrode 15 and a second transparent electrode 14 are positioned adjacent to opposite surfaces of the liquid crystal layer so that a voltage can be applied, by means of a voltage source 16, across the liquid crystal layer. The liquid crystal layer is in addition sandwiched between a pair of glass plates 18 and 20. The inner surfaces of the glass plates 18 and 20, which are proximate to the liquid crystal layer 44, are physically treated, as by buffing. Substrates 22 and 24 provide support structure for the aforementioned layers of the display.

As is well-known in the LCD art, when the material of the liquid crystal layer 44 is in the nematic phase and the inner surfaces of the plates 18 and 20 (the surfaces adjacent to the layer 44) are buffed and oriented with their buffed directions perpendicular, the director n of the liquid crystal material, absent any applied electrical voltage, will tend to align with the buffing direction in the regions of the layer proximate each of the plates 18 to the second major surface adjacent to the plate 20. Consequently, in the absence of an applied electric field, the direction of polarization of incoming polarized light will be rotated by 90° in travelling through the liquid crystal layer. When the glass plates and the liquid crystal layer are placed between crossed polarizers, such as the polarizer 48 and the analyzer 41, light polarized by the polarizer 48 and traversing the display, as exemplified by the light ray 26, will thus be aligned with the polarization direction of the analyzer 41 and therefore will pass through the analyzer. When a sufficient voltage is applied to the electrodes 18 and 20, however, the applied electric field causes the director of the liquid crystal material to tend to align parallel to the field. With the liquid crystal material in this state, light passed by the polarizer 48, as illustrated by the light ray 28, will be extinguished by the analyzer 41. Thus an energized pair of electrodes will produce a dark region of the display, while light passing through regions of the display which are not subject to an applied field will produce illuminated regions. As is well-known in the LCD display art, an appropriate pattern of electrodes, activated in selected combinations, can be utilized in this manner to display alphanumeric or graphic information.

Figure 3:
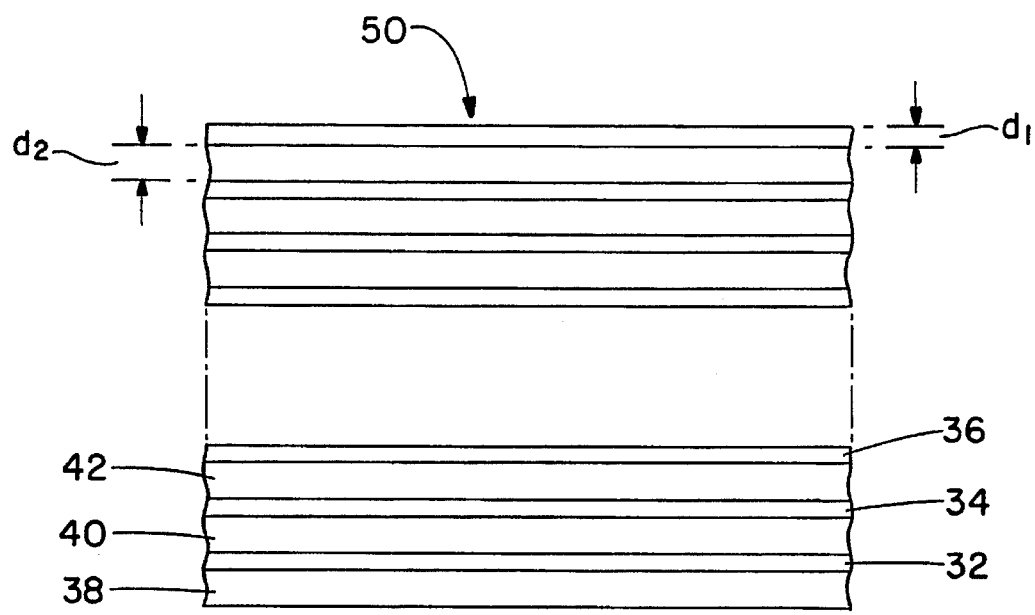
FIG. 3 is an enlarged view of the multilayer portion of the display depicted in FIG. 2.

A multilayer thin film compensator 30 is positioned in the display between the polarizer layer and the analyzer layer to enhance the viewing properties of a liquid crystal display over a wide range of viewing angles. The compensator includes a first series of layers having a first refractive index which alternate with a second series of layers having a second refractive index. The values of the first and second refractive indices, as well as the thicknesses of the layers in the first and the second series, are chosen such that the phase retardation of the multilayer is equal in magnitude but opposite in sign to the phase retardation of the liquid crystal layer. An enlarged view of the multilayer 30 is depicted in a cross-sectional side view in FIG. 3. This view shows a first series 32, 34, 36 . . . of layers having a first thickness $d_1$ and a second series 38, 40, 42 . . . of layers having a second thickness $d_2$. As those skilled in the art of optical thin films will appreciate, in order to effectively illustrate the concept of this invention, the thicknesses of the layers are exaggerated relative to the dimensions of an actual multilayer, as indicated by the dashed lines in the middle of the multilayer.

Although the preferred embodiment illustrated here includes a multilayer compensator having two series of alternating layers comprising a first and a second optical material, those skilled in the art will recognize that the concept of a multilayer compensator applies as well to more complex multilayers including periodic layer structures of three or more materials, as well as multilayers in which the different layers of a particular material vary in thickness. Furthermore, the inventive concept is applicable to reflective as well as transmissive type liquid crystal displays.

What has heretofore not been recognized is that within compensator 30, the composition of the negative birefringent thin film layer can be the polyimides of the instant invention, which can be custom-tailored to a desired negative birefringent value, and do not need to resort to the use of stretching to achieve the desired orientation, and additionally need not be comprised of an inorganic birefringent crystal, such as sapphire.

Another type of liquid crystal display which can benefit from this invention is the supertwist nematic cell, which exhibits voltage response characteristics allowing it to be addressed by simple multiplexing, thereby avoiding the expense and manufacturing difficulty associated with active matrix addressing. The supertwist configuration is achieved by doping the nematic liquid crystal material with a chiral additive which gives the cell 270° of total twist. Supertwist nematic cells are typically used in the normally black configuration, often employing the compensation techniques described above for normally black displays. Such cells, however, can also be operated in the normally white mode and such normally white supertwist displays would also benefit from the addition of the multilayer compensator of this invention for field of view enhancement. Moreover, the compensation scheme of this invention is broadly applicable to any liquid crystal display which employs a homeotropically aligned state as part of its operation. Other types of liquid crystal displays, such as for example, ferroelectric, can be improved with this invention by acquiring a wider field of view in the aligned state which exhibits C-axis symmetry.

Figure 4:
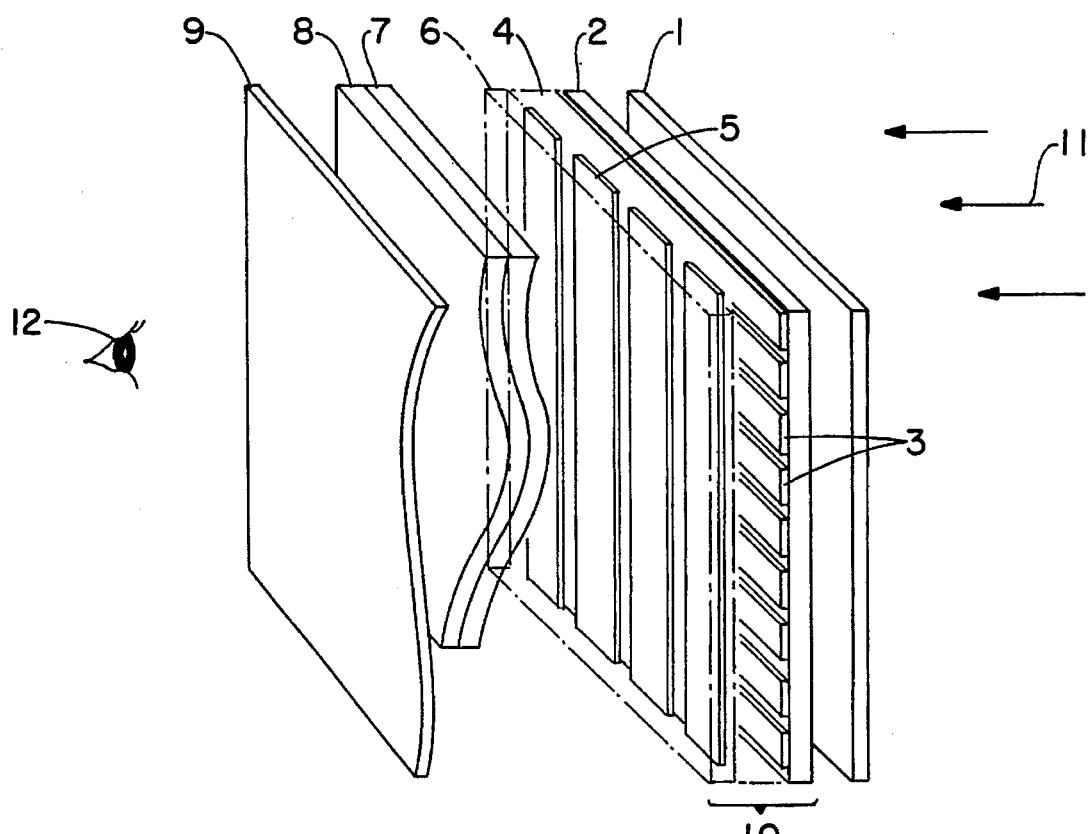
FIG. 4 is a perspective view of an alternative liquid crystal display.

In an alternative embodiment of this invention, FIG. 4 shows a perspective view of a liquid crystal display (LCD) constructed according to the teachings of U.S. Pat. No. 5,138,474, which is hereinby fully incorporated by reference. The display has a structure that includes a liquid crystal cell 10 and films 7,8 having positive and negative intrisic birefringence values respectively, and are held between two sheets of polarizing sheets 1,9 in an opposed configuration. Additionally liquid crystal cell 10 includes two sheets of substrates 2,6, two transparent electrodes 3,5, and a liquid crystal layer 4 held between the electrodes, and the films interposed between the liquid crystal cell and the polarizing sheet 9 which is provided on the side of an observer.

Once again, as previously, the negative intrinsic birefringent thin film layer need not be at least one uniaxially stretched film of a polymer having a negative intrinsic birefringence. Rather, the negative birefringent thin film layer can be the polyimides of the instant invention, which can be custom-tailored to a desired negative birefringent value, and do not need to resort to the use of stretching to achieve the desired orientation.

While this invention has focused on active matrix displays, there is no need to limit the invention to such. In fact, the invention is equally applicable to liquid crystal displays which have both active and passive display areas, the active areas typically presented by selective energization of dichroic or other liquid crystal, and the passive areas being created by a mask. One such example of a display cell having both active and passive areas is that shown in U.S. Pat. No. 5,130,827, to Litton Systems, Inc., which is hereinby fully incorporated by reference. Another such illustration of active and passive matrix components can be found in U.S. Pat. No. 5,128,782, which is also hereinby fully incorporated by reference. Displays which incorporate fully passive display areas are also a part of this invention.

As discussed in U.S. Pat. No. 5,130,827, and shown in FIG. 10, a LCD with passive and active display areas is generally indicated by the reference numeral 70. The display includes an arcuate fixed element bar graph section 72 and a digital readout section 73, both of which are active matrix displays. The display further includes a parameter identification indicia 74, parameter units of measurement indicia 76 and bar indicia 78, all of which are passive. The particular display shown gives an indication of engine Inlet Turbine Temperature ("ITT") in °C. It will be understood that as the temperature changes, both the arcuate bar graph section 72 and the digital readout section 73 will change as required in order to give an accurate indication of temperature. The passive display portions 74, 76, and 78 do not change. Both the active portions 72 and 73 and passive portions 74, 76, and 78 of the display are illuminated by a rear light source 111, best seen in FIG. 4.

In FIG. 11, an LCD cell is generally designated by the reference numeral 80. As well known in the art, the cell comprises a front glass plate 81 and a rear glass plate 82, best seen in FIG. 4. The plates 81 and 82 are spaced from one another and a seal bead 83 between the two plates forms a closed cavity 84. The cavity 84 is filled with a dichroic liquid crystal mixture and a plurality of electrodes 86 are arranged in an arcuate bar graph pattern while a second plurality of electrodes 88 are arranged in three FIG. 8 patterns. In use, the electrodes 86 are energized by means of traces 87 to give an arcuate bar graph readout of ITT, and the electrodes 88 are energized by means of traces 89 to give a numerical digital readout of ITT. The dichroic liquid is confined to the cavity 84 and creates an active area which is substantially less than the total area of the display.

The remaining portion of the display is a passive area 91 which is a substantial portion of the total area of the display. The passive area can be defined as that area of the display which is free of dichroic liquid. A second seal bead 93 is provided around the periphery of the display to secure the front and rear glass plates 81 and 82 together in order to provide a second cavity 94. It may be desirable in certain instances to fill the second cavity 94 with an index matching fluid to provide a display which is uniform in appearance both in the region of the index matching fluid and in the region of the two seal beads 83 and 93 which are often transparent. The use of an indexing matching fluid in the second cavity 94 is optional, however, and may be omitted if desired. In an alternate embodiment, the second cavity 94 may be filled with a colored light transmissive fluid to impart a color to the passive portion of the display.

FIG. 12 shows a mask generally designated by the reference numeral 100 which may be used with the LCD cell of FIG. 11. The mask comprises a rectangular cutout 101, an arcuate cutout 102, the indicia markings 74, 76, and 78, and an opaque background portion 106. The cutouts 101 and 102 are positioned to be in registration with the FIG. 8 elements 88 and the arcuate bar graph elements 86, respectively, of the LCD cell 80 shown in FIG. 11, when the mask 100 is placed against the front glass of the cell. The indicia markings 74, 76, and 78 are in registration with the passive area of the display beyond the perimeter of the closed cavity 84. Although some or all of the traces 87 and 89 may be in registration with the indicia markings 74, 76, and 78 of the mask, the traces are transparent as well known in the art; and accordingly, light from the rear light source 111 is able to pass through the passive area of the display and illuminate the indicia portions 74, 76, and 78. The indicia of the mask may be left clear or colored as desired. As an example, the numerical indicia 76 and the parameter identification indicia 74 may be white, the bar indicia 78 between points 96 and 97 may be green followed by thicker yellow indicia between points 97 and 98 and thicker red indicia between points 98 and 99. The opaque background area 106 of the mask may be black or any color desired as long as contrast is provided with the indicia portions 74, 76, and 78.

FIG. 13 is an exploded perspective view of an LCD dial indicator which has been removed from the housing 108. The mask 100 is positioned adjacent the front glass 81 of the LCD cell 80, and a transflector 110 is positioned adjacent the rear glass 82. The transflector 110 acts as a light diffuser for the LCD cell 80 in either a reflective mode in which light entering from the front of the LCD is reflected back through the LCD, or in a passive mode in which the transflector 110 is a diffuser for one or more lamps 111 positioned behind the transflector.

Although the mask 100 is shown positioned on the front surface of the LCD 80, it may also be positioned on the rear surface of the LCD between the display and the transflector 110 as shown by the phantom outline 118. In either position, the mask blocks light from the transflector 110 in those regions 106 which are opaque and allows light to pass through the indicia portions 74, 76, and 78 and through the cutout portions 101 and 102. The light from the transflector 110 which appears in the cutouts 101 and 102 is additionally controlled by the dichroic liquid crystal contained within the central cavity 84. In this way the information appearing in the cutouts 101 and 102 may be changed while the information appearing in the indicia portions 74, 76, and 78 are unchangeable.

Through the use of the invention, the same arcuate bar graph electrodes 86 and digital numerical electrodes 88 may be used with different masks 100 in order to provide different parameter presentations.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A homopolymer polyimide film for use in negative birefringence layers in liquid crystal displays, the film having a negative birefringence of 0.001 to 0.2, the film having been prepared from solutions of soluble polyimides having an aromatic dianhydride of general formula (II):

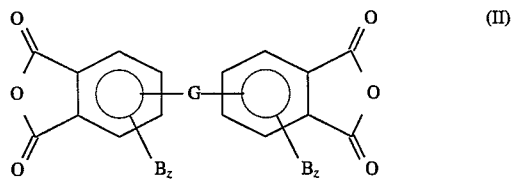

and a polyaromatic diamine of formula (III)

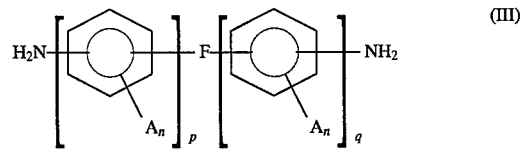

where

F and G are selected independently from the group consisting of a covalent bond, a $CH_2$ group, a $C(CH_3)_2$ group, a $C(CX_3)_2$ group where X is a halogen, a CO group, an O atom, a S atom, a $SO_2$ group, a $Si(R)_2$ group wherein R is a substituent selected independently from the group consisting of H, phenyl, halogenated phenyl, alkyl and halogenated alkyl from 1 to 20 carbons, and a N(R) group wherein R is as defined previously;

A is selected from the group consisting of hydrogen, halogen, alkyl, halogenated alkyl, nitro, cyano, thioalkyl, alkoxy, halogenated alkoxy, aryl and halogenated aryl, aliphatic and aromatic esters and combinations thereof of from 1 to 20 carbons;

B is selected from the group consisting of halogens, $C_{1-3}$ alkyls, $C_{1-3}$ halogenated alkyls, phenyl or substituted phenyl wherein the substituents on the phenyl ting include halogens, $C_{1-3}$ alkyls, $C_{1-3}$ halogenated alkyls and combinations thereof;

z is an integer from 0 to 3;

n is an integer from 0 to 4; and p and q are integers from 0 to 3 and 1 to 3 respectively, and when p and q are greater than 1, the linking group between benzyl or substituted benzyl groups is F; and wherein the negative birefringence of the film is determined by controlling the degree of in-plane orientation of the polyimide by the selection of G, F, B and A, and the values of n, p, q and z which affects the polyimide backbone chain rigidity and linearity, the higher the rigidity and linearity of the polyimide backbone, the larger the value of the negative birefringence of the polyimide film.

2. The film of claim 1 wherein the aromatic dianhydride is selected from the group consisting of 3,3',4,4'-benzophenonetetracarboxylic acid dianhydride, 2,3,3',4'-benzophenonetetracarboxylic acid dianhydride, 2,2',3,3'-benzophenone tetracarboxylic acid dianhydride, 3,3',4,4'-biphenyltetracarboxylic acid dianhydride, bis(2,3- dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, bis(3,4-dicarboxyphenyl)ether dianhydride, bis(3,4-dicarboxyphenyl)sulfone dianhydride, 4,4'-[4,4'-isopropylidene-di(p-phenyleneoxy)]bis(phthalic anhydride), N,N-(3,4-dicarboxyphenyl)-N-methylamine dianhydride, bis(3,4-dicarboxyphenyl)diethylsilane dianhydride, 2,3,6,7-naphthalene-tetracarboxylic acid dianhydride, 1,2,5,6-naphthalene-tetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, 2,2'-dibromo-4,4',5,5'-biphenyl tetracarboxylic dianhydride, 2,2'-dichloro-4,4',5,5'-biphenyl tetracarboxylic dianhydride, 2,2'-diiodo-4,4', 5,5'-biphenyl tetracarboxylic dianhydride, 2,2'-difluoro-4,4', 5,5'-biphenyl tetracarboxylic dianhydride, 2,2'-bis(trifluoromethyl)-4,4'-5,5'-biphenyltetracarboxylic dianhydride, 2,2'-bis(trichloromethyl)-4,4'-5,5'-biphenyltetracarboxylic dianhydride, 2,2'-bis(tribromomethyl)-4,4'-5,5'-biphenyltetracarboxylic dianhydride, and 2,2'-bis(triiodomethyl)-4,4'-5, 5'-biphenyltetracarboxylic dianhydride.

3. The film of claim 1 wherein the diamine is selected from the group consisting of o-phenylenediamine, m-phenylenediamine, p-phenylenediamine, 2,4-diaminotoluene, 1,4-diamino-2-methoxybenzene, 1,4-diamino-2-phenylbenzene, 1,3-diamino-4-chlorobenzene, 4,4'-diaminobiphenyl, 4,4'-diaminodiphenylmethane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, 3,3'-diaminobenzophenone, 1,8-diaminonaphthalene, 1,5-diiminonaphthalene, 2,6-diaminopyridine, 2,4-diaminopyrimidine, 2,4-diamino-s-triazine, 2,2'-bis(trifluoromethyl)-4,4'-diaminobiphenyl, 2,2'-dibromo-4, 4'-diaminobiphenyl, 2,2'-dicyano-4,4'-diaminobiphenyl, 2,2'-dichloro-6,6'-dimethyl-4,4'-diaminobiphenyl, 2,2'-dimethyl-4,4'-diaminobiphenyl, 3,3'-dimethyl-4,4'-diaminobiphenyl, 2,2'-dicarboalkoxy-4,4'-diaminobiphenyl and 2,2'-dicarboalkoxy-6,6'-dimethyl-4,4'-diaminobiphenyl.

4. The film of claim 1 wherein the aromatic dianhydride is formula (X)

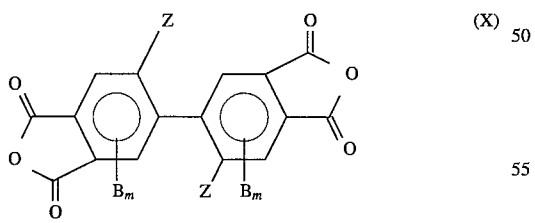

wherein Z is selected from the same group defined previously for B and m is an integer from 0 to 2.

5. A copolyimide film for use in negative birefringence layers in liquid crystal displays, the film having a negative birefringence of 0.001 to 0.2, the film having been prepared from solutions of soluble polyimides having at least one aromatic dianhydride of general formula (II)

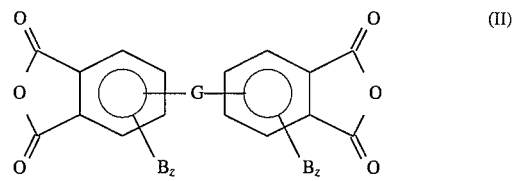

and at least one polyaromatic diamine of formula (III)

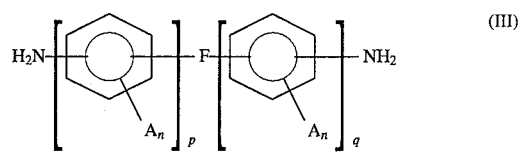

where

F and G are substituents selected independently from the group consisting of a covalent bond, a $CH_2$ group, a $C(CH_3)_2$ group, a $C(CX_3)_2$ group wherein X is a halogen, a CO group, an O atom, a S atom, a $SO_2$ group, a $Si(R)_2$ group wherein R is a substituent selected from the group consisting of H, phenyl, halogenated phenyl, alkyl and halogenated alkyl of from 1 to 20 carbons, and a N(R) group wherein R is as defined previously;

A is selected from the group consisting of hydrogen, halogen, alkyl, halogenated alkyl, nitro, cyano, thioalkyl, alkoxy, halogenated alkoxy, aryl and substituted aryl, aliphatic and aromatic esters and combinations thereof of from 1 to 20 carbons;

B is selected from the group consisting of halogens, $C_{1-3}$ alkyls, $C_{1-3}$ halogenated alkyls, phenyl and halogenated phenyl wherein the substituents on the phenyl ring include halogens, $C_{1-3}$ alkyls, $C_{1-3}$ halogenated alkyls and combinations thereof;

z is an integer from 0 to 3;

n is an integer from 0 to 4; and p and q are integers from 0 to 3 and 1 to 3 respectively, and when p and q are greater than 1, the linking group between benzyl or substituted benzyl groups is F;

to form a copolyimide of formula (VII)

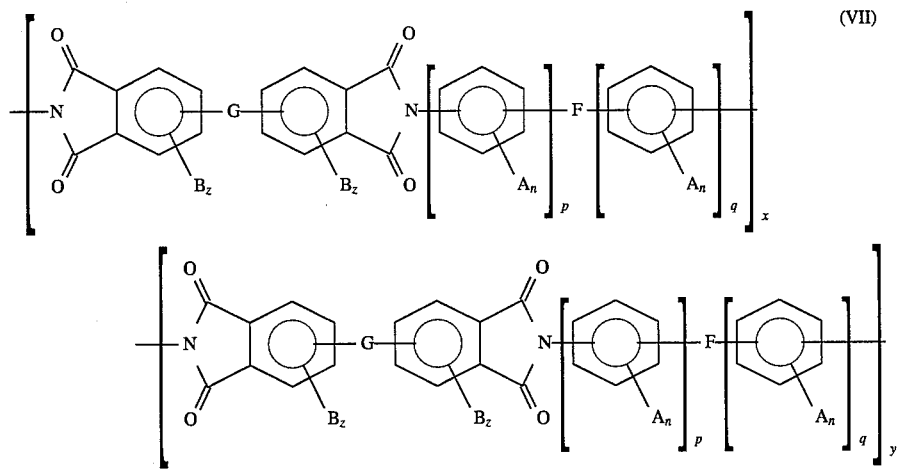

wherein x varies from 100 to 0 while y varies correspondingly from 0 to 100; and wherein the negative birefringence of the film is determined by the control of the degree of in-plane orientation of the copolyimide by the selection of G, F, B and A, and the values of n, p, q, x, y and z, which affects the polyimide backbone chain rigidity and linearity, the higher the rigidity and linearity of the polyimide backbone, the larger the value of the negative birefringence of the polyimide film.

6. The film of claim 5 wherein the aromatic dianhydride is selected from the group consisting of 3,3',4,4'-benzophenonetetracarboxylic acid dianhydride, 2,3,3',4'-benzophenonetetracarboxylic acid dianhydride, 2,2',3,3'-benzophenone tetracarboxylic acid dianhydride, 3,3',4,4'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, bis(3,4-dicarboxyphenyl)ether dianhydride, bis(3,4-dicarboxyphenyl)sulfone dianhydride, 4,4'-[4,4'-isopropylidene-di(p-phenyleneoxy)]bis(phthalic anhydride), N,N-(3,4-dicarboxyphenyl)-N-methylamine dianhydride, bis(3,4-dicarboxyphenyl)diethylsilane dianhydride, 2,3,6,7-naphthalene-tetracarboxylic acid dianhydride, 1,2,5,6-naphthalene-tetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, 2,2'-dibromo-4,4',5,5'-biphenyl tetracarboxylic dianhydride, 2,2'-dichloro-4,4',5,5'-biphenyl tetracarboxylic dianhydride, 2,2'-diiodo-4,4',5,5'-biphenyl tetracarboxylic dianhydride, 2,2'-difluoro-4,4',5,5'-biphenyl tetracarboxylic dianhydride, 2,2'-bis(trifluoromethyl)-4,4'-5,5'-biphenyltetracarboxylic dianhydride, 2,2'-bis(trichloromethyl)-4,4'-5,5'-biphenyltetracarboxylic dianhydride, 2,2'-bis(tribromomethyl)-4,4'-5,5'-biphenyltetracarboxylic dianhydride, and 2,2'-bis(triiodomethyl)-4,4'-5,5'-biphenyltetracarboxylic dianhydride.

7. The film of claim 5 wherein the diamine is selected from the group consisting of o-phenylenediamine, m-phenylenediamine, p-phenylenediamine, 2,4-diaminotoluene, 1,4-diamino-2-methoxybenzene, 1,4-diamino-2-phenylbenzene, 1,3-diamino-4-chlorobenzene, 4,4'-diaminobiphenyl, 4,4'-diaminodiphenylmethane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether,1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, 3,3'-diaminobenzophenone, 1,8-diaminonaphthalene, 1,5-diminonaphthalene, 2,6-diaminopyridine, 2,4-diaminopyrimidine, 2,4-diamino-s-triazine, 2,2'-bis(trifluoromethyl)-4,4'-diaminobiphenyl, 2,2'-dibromo-4,4'-diaminobiphenyl, 2,2'-dicyano-4,4'-diaminobiphenyl, 2,2'-dichloro-6,6'-dimethyl-4,4'-diaminobiphenyl, 2,2'-dimethyl-4,4'-diaminobiphenyl, 3,3'-dimethyl-4,4'-diaminobiphenyl, 2,2'-dicarboalkoxy-4,4'-diaminobiphenyl and 2,2'-dicarboalkoxy-6,6'-dimethyl-4,4'-diaminobiphenyl.

8. The film of claim 5 wherein the aromatic dianhydride is formula (X)

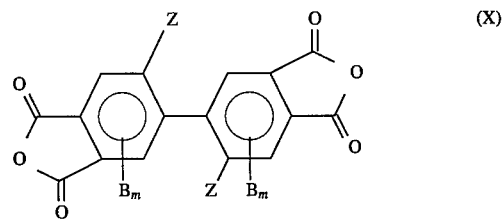

wherein Z is selected from the group previously defined for B and m is an integer from 0 to 2.

9. A copolyimide film for use in negative birefringence layers in liquid crystal displays, the film having a negative birefringence of 0.001 to 0.2, the film having been prepared from solutions of soluble polyimides having at least one first aromatic dianhydride of general formula (I)

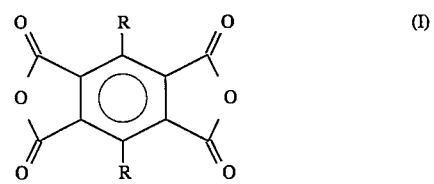

and at least one second aromatic dianhydride of formula (X)

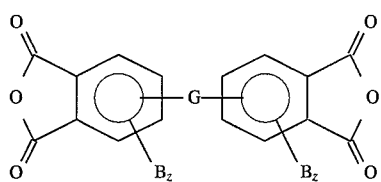

and at least one polyaromatic diamine of formula (III)

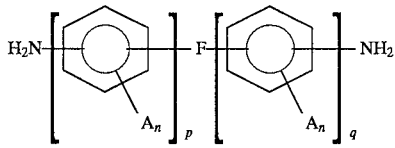

where each

R is a substituent selected independently from the group consisting of H, phenyl, halogenated phenyl, alkyl and halogenated alkyl from 1 to 20 carbons;

F and G are substituents selected independently from the group consisting of a covalent bond, a $CH_2$ group, a $C(CH_3)_2$ group, a $C(CX_3)_2$ group wherein X is a halogen, a CO group, an O atom, a S atom, a $SO_2$ group, a $Si(R)_2$ group wherein R is as defined previously and a N(R) group wherein R is as defined previously;

A is selected from the group consisting of hydrogen, halogen, alkyl, halogenated alkyl, nitro, cyano, thio-alkyl, alkoxy, halogenated alkoxy, aryl and halogenated aryl, aliphatic and aromatic ester and combinations thereof of from 1 to 20 carbons;

B is selected from the group consisting of halogens, $C_{1-3}$ alkyls, $C_{1-3}$ halogenated alkyls, phenyl and halogenated phenyl wherein the substituents on the phenyl ring include halogens, $C_{1-3}$ alkyls, $C_{1-3}$ halogenated alkyls and combinations thereof;

z is an integer from 0 to 3;

n is an integer from 0 to 4; and p and q are integers from 0 to 3 and 1 to 3 respectively, and when p and q are greater than 1, the linking group between benzyl or substituted benzyl groups is F;

to form a copolyimide of formula (VIII)

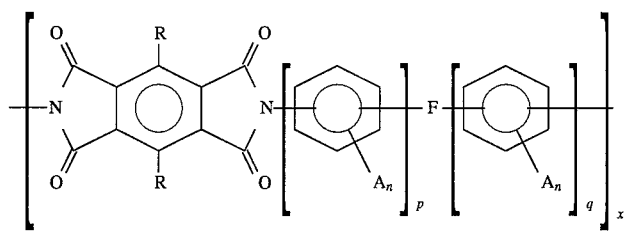

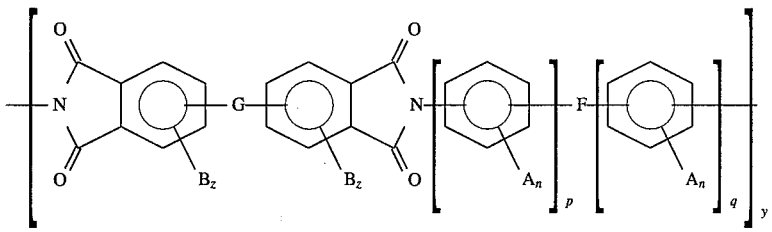

wherein x varies from 100 to 0 while y varies correspondingly from 0 to 100; and wherein the negative birefringence of the film is determined by the control of the degree of in-plane orientation of the polyimide by the selection of R, G, F, B and A, and the values of n, p, q, x, y and z, which affects the polyimide backbone chain rigidity and linearity, the higher the rigidity and linearity of the polyimide backbone, the larger the value of the negative birefringence of the polyimide film.

10. The film of claim 9 wherein the dianhydride is selected from the group consisting of pyromelletic dianhydride, 3,6-diphenylpyromellitic dianhydride, 3,6-bis(trifluoromethyl)pyromellitic dianhydride, 3,6-bis(methyl)pyromellitic dianhydride, 3,6-diiodopyromellitic dianhydride, 3,6-dibromopyromellitic dianhydride and 3,6-dichloropyromellitic dianhydride, 3,3',4,4'-benzophenonetetracarboxylic acid dianhydride, 2,3,3',4'-benzophenonetetracarboxylic acid dianhydride, 2,2',3,3'-benzophenone tetracarboxylic acid dianhydride, 3,3',4,4'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, bis(3,4-dicarboxyphenyl)ether dianhydride, bis(3,4-dicarboxyphenyl)sulfone dianhydride, 4,4'-[4,4'-isopropylidene-di(p-phenyleneoxy)]bis(phthalic anhydride), N,N-(3,4-dicarboxyphenyl)-N-methylamine dianhydride, bis(3,4-dicarboxyphenyl)diethylsilane dianhydride, 2,3,6,7-naphthalene-tetracarboxylic acid dianhydride, 1,2,5,6-naphthalene-tetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, 2,2'-dibromo-4,4',5,5'-biphenyl tetracarboxylic dianhydride, 2,2'-dichloro-4,4',5,5'-biphenyl tetracarboxylic dianhydride, 2,2'-diiodo-4,4',5,5'-biphenyl tetracarboxylic dianhydride, 2,2'-difluoro-4,4',5,5'-biphenyl tetracarboxylic dianhydride, 2,2'-bis(trifluoromethyl)-4,4'-5,5'-biphenyltetracarboxylic dianhydride, 2,2'-bis(trichloromethyl)-4,4'-5,5'-biphenyltetracarboxylic dianhydride, 2,2'-bis(tribromomethyl)-4,4'-5,5'-biphenyltetracarboxylic dianhydride, and 2,2'-bis(triiodomethyl)-4,4'-5,5'-biphenyltetracarboxylic dianhydride.

11. The film of claim 9 wherein the diamine is selected from the group consisting of o-phenylenediamine, m-phenylenediamine, p-phenylenediamine, 2,4-diaminotoluene, 1,4-diamino-2-methoxybenzene, 1,4-diamino-2-phenylbenzene, 1,3-diamino-4-chlorobenzene, 4,4'-diaminobiphenyl, 4,4'-diaminodiphenylmethane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis [4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, 3,3'-diaminobenzophenone, 1,8-diaminonaphthalene, 1,5-diminonaphthalene, 2,6-diaminopyridine, 2,4-diaminopyrimidine, 2,4-diamino-s-triazine, 2,2'-bis(trifluoromethyl)-4,4'-diaminobiphenyl, 2,2'-dibromo-4,4'-diaminobiphenyl, 2,2'-dicyano-4,4'-diaminobiphenyl, 2,2'-dichloro-6,6'-dimethyl-4,4'-diaminobiphenyl, 2,2'-dimethyl-4,4'-diaminobiphenyl, 3,3'-dimethyl-4,4'-diaminobiphenyl, 2,2'-dicarboalkoxy-4,4'-diaminobiphenyl and 2,2'-dicarboalkoxy-6,6'-dimethyl-4,4'-diaminobiphenyl.

12. The film of claim 9 wherein the aromatic dianhydride is formula (X)

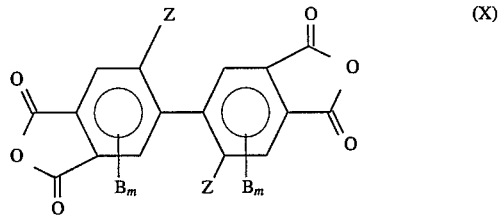

wherein Z is selected from the same group defined previously for B and m is an integer from 0 to 2.

* * * * *

UNITED STATES PATENT AND TRADEMARK OFFICE
CERTIFICATE OF CORRECTION

PATENT NO. : 5,480,964
DATED : January 2, 1996
INVENTOR(S) : Frank W. Harris and Stephen Z. D. Cheng It is certified that error appears in the above-indentified patent and that said Letters Patent is hereby corrected as shown below:

Column 1, Line 7 reads "BASA" and should read --NASA--.

Signed and Sealed this

Twentieth Day of August, 1996

Attest:

BRUCE LEHMAN

*Attesting Officer*  *Commissioner of Patents and Trademarks*